(12) United States Patent
Cannas et al.

(10) Patent No.: US 10,836,868 B2
(45) Date of Patent: Nov. 17, 2020

(54) CATALYST HAVING A POLYSILOXANE STRUCTURAL UNIT FOR HARDENABLE COMPOSITIONS

(71) Applicant: SIKA TECHNOLOGY AG, Baar (CH)

(72) Inventors: Rita Cannas, Dübendorf (CH); Urs Burckhardt, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 99 days.

(21) Appl. No.: 15/777,900

(22) PCT Filed: Dec. 14, 2016

(86) PCT No.: PCT/EP2016/081018
§ 371 (c)(1),
(2) Date: May 21, 2018

(87) PCT Pub. No.: WO2017/102851
PCT Pub. Date: Jun. 22, 2017

(65) Prior Publication Data
US 2018/0327549 A1 Nov. 15, 2018

(30) Foreign Application Priority Data
Dec. 15, 2015 (EP) .................................... 15200134

(51) Int. Cl.
| | | |
|---|---|---|
| *C08G 77/388* | (2006.01) | |
| *C09D 183/08* | (2006.01) | |
| *C08G 77/08* | (2006.01) | |
| *C09J 183/08* | (2006.01) | |
| *C08L 83/08* | (2006.01) | |
| *C08J 3/24* | (2006.01) | |
| *C09K 3/10* | (2006.01) | |
| *C08G 77/26* | (2006.01) | |
| *C08G 77/00* | (2006.01) | |

(52) U.S. Cl.
CPC ........... *C08G 77/388* (2013.01); *C08G 77/08* (2013.01); *C08J 3/24* (2013.01); *C08L 83/08* (2013.01); *C09D 183/08* (2013.01); *C09J 183/08* (2013.01); *C09K 3/1018* (2013.01); *C08G 77/26* (2013.01); *C08G 77/70* (2013.01); *C08J 2383/08* (2013.01)

(58) Field of Classification Search
CPC ....... C08G 77/08; C09J 183/08; C09D 183/08
See application file for complete search history.

(56) References Cited

U.S. PATENT DOCUMENTS

2015/0057412 A1* 2/2015 Knott ....................... C07F 7/21
524/858

FOREIGN PATENT DOCUMENTS

| DE | 10 2005 004 704 A1 | 8/2006 |
|---|---|---|
| EP | 2 840 087 A1 | 2/2015 |
| EP | 2840087 | * 2/2015 |

OTHER PUBLICATIONS

Hu, X., "Nucleophilic ring opening of aziridines," Tetrahedron, 2004, vol. 60, pp. 2701-2743.
Mar. 23, 2017 International Search Report issued in International Patent Application No. PCT/EP2016/081018.
Jun. 19, 2018 International Preliminary Report on Patentability issued in International Patent Application No. PCT/EP2016/081018.

* cited by examiner

Primary Examiner — Kuo Lang Peng
(74) Attorney, Agent, or Firm — Oliff PLC

(57) ABSTRACT

A conversion product which has at least one aliphatic amidine or guanidine group and at least one polysiloxane radical, and the use of the conversion product as a catalyst for cross-linking hardenable compositions, in particular based on polymers containing silane groups. The conversion product is largely odor-free, non-volatile, and of low toxicity. The conversion product accelerates the cross-linking of such compositions surprisingly well, does not impair the stability of such compositions in storage, and is very highly compatible, which means that such compositions do not tend toward separation or migration or evaporation of the catalyst.

7 Claims, No Drawings

CATALYST HAVING A POLYSILOXANE STRUCTURAL UNIT FOR HARDENABLE COMPOSITIONS

TECHNICAL FIELD

The invention relates to amidine and guanidine catalysts for curable compositions, especially based on polymers containing silane groups.

PRIOR ART

Curable compositions based on polymers containing silane groups play an important role in many industrial applications, for example as adhesives, sealants or coatings. Polymers containing silane groups here are especially polyorganosiloxanes, which are commonly referred to as "silicones" or "silicone rubbers", and organic polymers containing silane groups, which are also referred to as "silane-functional polymers", "silane-modified polymers" (SMP) or "silane-terminated polymers" (STP). They are cured via crosslinking reactions of the silane groups, which are hydrolyzed under the influence of moisture, condense with one another as silanol groups and form siloxane bonds.

Acceleration of the curing is frequently accomplished using catalysts. These are very often substances of toxicological concern which constitute a potential hazard to users and the environment, especially after the curing of the composition, if the catalyst or degradation products thereof are released by outgassing, migration or washing-out.

Crosslinking catalysts used are conventionally organotin compounds, especially dialkyltin(IV) carboxylates. These are notable for very high activity in relation to the silanol condensation and are very hydrolysis-resistant, but they are classified as being harmful to health and a severe water pollution hazard. They are often combined with further catalysts, mainly basic compounds, such as amines in particular, which particularly accelerate the preceding hydrolysis of the silane groups.

Because greater weight is being given to EHS aspects by professional organizations and users and because of stricter government regulation, there have been increased efforts for some time to replace organotin compounds with other catalysts of lower toxicity. For instance, organotitanates, -zirconates and -aluminates are used as alternative metal catalysts. However, these usually have lower catalytic activity in relation to the silanol condensation and bring about much slower crosslinking. Because of their lack of hydrolysis stability, they can lose a large part of their activity in the course of storage of the composition as a result of residual moisture in the ingredients, which causes the curing to slow significantly or stop entirely.

A further alternative to organotin compounds is highly basic nitrogen compounds from the class of the amidines and guanidines, which can be used in combination with the metal catalysts mentioned or else alone. However, many of the commonly used amidine and guanidine catalysts, such as, in particular, 1,8-diazabicyclo[5.4.0]undec-7-ene (DBU) and 1,1,3,3-tetramethylguanidine (TMG), are volatile and odorous, and also harmful to health and hazardous to the environment. Moreover, they have a tendency to migrate because of low compatibility with the composition and hence to cause separation, exudation or substrate soiling. The use of aromatic amidines and guanidines that are solid at room temperature provides a remedy here, but requires the use of suitable solvents and brings losses in catalytic activity and hence crosslinking rate.

SUMMARY OF THE INVENTION

It is therefore an object of the present invention to provide a catalyst for the crosslinking of curable compositions, especially based on polymers containing silane groups, which has a high catalytic activity and hence enables rapid curing of the composition applied, and also has a high selectivity and hence does not unduly impair the storage stability of the composition. Furthermore, the catalyst is to have a low vapor pressure and high compatibility with such compositions, such that it has no tendency either to separate or migrate or to evaporate, and is to have minimum odor and low toxicity.

This object is achieved by a reaction product as claimed in claim 1. The reaction product has at least one aliphatic amine or guanidine group and a polysiloxane radical. It is liquid at room temperature and hence easily processible even without solvent, has an extremely low vapor pressure and is completely odorless and largely nontoxic. When used as a catalyst, the reaction product exhibits surprisingly high activity and good selectivity in relation to the crosslinking of silane groups. Moreover, it surprisingly has good compatibility both with polar polymers such as polyethers or polyurethanes and with nonpolar polymers such as silicones, and exhibits neither separation nor migration.

With these properties, the reaction product is particularly suitable as a catalyst for the crosslinking of compositions based on polymers containing silane groups, where, as sole catalyst or in combination with further catalysts, without troublesome odor immissions, it enables rapid curing to give a mechanically high-quality and durable material, without impairing the storability of the uncured composition. Both before and after curing, it has excellent compatibility with the composition and does not have any tendency either to separate or to migrate, by contrast with many amidine or guanidine catalysts from the prior art, which often have inadequate compatibility and hence cause unwanted migration effects. The reaction product enables low-emission and low-odor products which have neither greasy nor tacky surfaces, nor do they cause substrate soiling. Finally, the reaction product is preparable in a surprisingly simple and rapid process without auxiliaries and processing or purification from conventional, inexpensive starting materials.

Further aspects of the invention are the subject of further independent claims. Particularly preferred embodiments of the invention are the subject of the dependent claims.

Ways of Executing the Invention

The invention provides a reaction product obtained from the reaction of at least one amidine or guanidine of the formula HZ or HX-A-Z
where
Z is an aliphatic amidine or guanidine group bonded via a nitrogen atom,
A is a divalent hydrocarbyl radical which has 2 to 30 carbon atoms and optionally contains unsaturated components and optionally ether oxygen or secondary or tertiary amine nitrogen, and
X is S or $NR^7$ where $R^7$ is a hydrogen radical or is an alkyl or cycloalkyl or aralkyl radical which has 1 to 8 carbon atoms and optionally contains a tertiary amino group or an amidine or guanidine group, where A together with $R^7$ may also be a trivalent hydrocarbyl radical which has 5 to 10 carbon atoms and optionally contains a tertiary amine nitrogen, and X and Z are separated from one another by a chain of at least two carbon atoms, with at least one polysiloxane of the formula (II)

  (II)

where q is 1 or 2,

P is a q-valent polysiloxane radical having 3 to 100 silicon atoms,

L is an alkylene radical which is bonded to a silicon atom of P and has 1 to 12 carbon atoms, and Q is a reactive group selected from glycidoxy, N-aziridinyl, 1,3-keto ester, 1,3-keto amide, (meth) acrylate and (meth)acrylamide.

"Aliphatic amidine or guanidine group" refers to an amidine or guanidine group which does not contain any nitrogen atom which is bonded directly to an aromatic ring or is part of a heteroaromatic ring system, for example imidazole or pyrimidine.

"Siloxane radical" refers to a radical containing at least one siloxane bond Si—O—Si.

"Polysiloxane radical" refers to a siloxane radical containing multiple siloxane bonds in sequence, i.e. Si—(O—Si)$_s$ units with s=2 or more.

The term "silane group" refers to a silyl group which is bonded to an organic radical or to a polysiloxane radical and has one to three, especially two or three, hydrolyzable substituents on the silicon atom. Particularly useful hydrolyzable substituents are alkoxy radicals. These silane groups are also referred to as "alkoxysilane groups". Silane groups may also be in partly or fully hydrolyzed form.

"Hydroxysilane", "isocyanatosilane", "aminosilane" and "mercaptosilane" refer respectively to organoalkoxysilanes having one or more hydroxyl, isocyanato, amino or mercapto groups on the organic radical in addition to the silane group.

"Primary amino group" and "primary amine nitrogen" refer respectively to an amino group and the nitrogen atom thereof that is bonded to a single organic radical and bears two hydrogen atoms; "secondary amino group" and "secondary amine nitrogen" refer respectively to an amino group and the nitrogen atom thereof that is bonded to two organic radicals which may also together be part of a ring and bears one hydrogen atom; and "tertiary amino group" and "tertiary amine nitrogen" refer respectively to an amino group and the nitrogen atom thereof that is bonded to three organic radicals, two or three of which together may also be part of one or more rings, and does not bear any hydrogen atom.

Substance names beginning with "poly", such as polyol or polyisocyanate, refer to substances containing, in a formal sense, two or more of the functional groups that occur in their name per molecule.

The term "organic polymer" encompasses a collective of macromolecules that are chemically homogeneous but differ in relation to degree of polymerization, molar mass and chain length, which has been prepared by a poly reaction (polymerization, polyaddition, polycondensation) and has a majority of carbon atoms in the polymer backbone, and reaction products of such a collective of macromolecules. Polymers having a polyorganosiloxane backbone (commonly referred to as "silicones") are not organic polymers in the context of the present document.

The term "polyether containing silane groups" also encompasses organic polymers which contain silane groups and which, in addition to polyether units, may also contain urethane groups, urea groups or thiourethane groups. Such polyethers containing silane groups may also be referred to as "polyurethanes containing silane groups".

"Molecular weight" is understood in the present document to mean the molar mass (in grams per mole) of a molecule or part of a molecule, also referred to as "radical". "Average molecular weight" is understood to mean the number-average $M_n$ of an oligomeric or polymeric mixture of molecules or radicals, which is typically determined by means of gel permeation chromatography (GPC) against polystyrene as standard.

"Storage-stable" or "storable" refers to a substance or composition when it can be stored at room temperature in a suitable container over a prolonged period, typically at least 3 months up to 6 months or more, without any change in its application or use properties, especially in the viscosity and crosslinking rate, to a degree of relevance for the use thereof as a result of the storage.

A dotted line in the formulae in this document in each case represents the bond between a substituent and the corresponding molecular radical.

"Room temperature" refers to a temperature of about 23° C.

The reactive Q group of the polysiloxane of the formula (II) is an electron acceptor, while the HZ or HX group of the amidine or guanidine is an electron donor. They can be reacted with one another in a simple manner in a nucleophilic addition or a nucleophilic substitution, forming a covalent bond Q'-Z or Q'-X.

The reaction of the amidine or guanidine of the formula HZ or HX-A-Z with the polysiloxane of the formula (II) is preferably conducted at a temperature in the range from 0 to 140° C., especially 20 to 120° C. The reaction can be effected with use of a solvent or preferably in a solvent-free manner. It is optionally possible to also use auxiliaries, for example catalysts, initiators or stabilizers. Preferably, no solvents or auxiliaries are used in the reaction.

In the reaction, the amidine or guanidine reacts with the polysiloxane of the formula (II) via the reactive Q groups thereof.

The amidine or guanidine is preferably used in a roughly stoichiometric or slightly superstoichiometric amount in relation to the reactive Q groups of the polysiloxane of the formula (II). This reaction is preferably conducted such that all the reactive Q groups of the polysiloxane are converted. The reaction product of the invention is thus preferably free of reactive Q groups.

The polysiloxane of the formula (II) preferably has a viscosity at 25° C. in the range from 1 to 500 mPa·s, more preferably 1 to 250 mPa·s, especially 1 to 100 mPa·s.

The reaction product may also be in tautomeric form with regard to its amidine or guanidine groups. All possible tautomeric forms are considered to be equivalent. In addition, it may also be in protonated form. It may likewise be in complexed form, especially with cations of zinc, iron or molybdenum.

Z is preferably

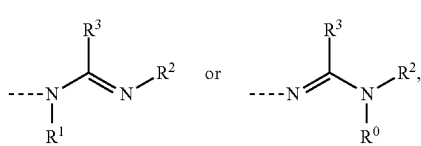

where $R^0$ is a hydrogen radical or an alkyl or cycloalkyl or aralkyl radical having 1 to 8 carbon atoms, $R^1$ is a hydrogen radical or an alkyl or cycloalkyl or aralkyl radical having 1 to 8 carbon atoms or together with $R^2$ is $R^6$, $R^2$ is a hydrogen radical or an alkyl, cycloalkyl or aralkyl radical which has 1 to 18 carbon atoms and optionally contains ether oxygen or tertiary amine nitrogen, or together with $R^1$ is $R^6$, $R^3$ is —$NR^4R^5$ or a hydrogen radical or an alkyl or cycloalkyl or aralkyl radical having 1 to 12 carbon atoms, where $R^4$ and $R^5$ are each independently a hydrogen radical or an alkyl, cycloalkyl or aralkyl radical which has 1 to 18 carbon atoms and optionally contains ether oxygen or tertiary amine nitrogen, $R^6$ is an optionally substituted 1,2-ethylene, 1,3-propylene or 1,4-butylene radical having 2 to 12 carbon atoms, $R^2$ and $R^0$ together may also be an alkylene radical which has 3 to 6 carbon atoms and optionally contains ether oxygen or tertiary amine nitrogen, $R^2$ and $R^3$ together may also be an alkylene radical having 3 to 6 carbon atoms, $R^4$ and $R^5$ together may also be an alkylene radical which has 4 to 7 carbon atoms and optionally contains ether oxygen or tertiary amine nitrogen, and $R^2$ and $R^5$ together may also be an alkylene radical having 2 to 12 carbon atoms.

$R^1$ is preferably a hydrogen radical or an alkyl radical having 1 to 4 carbon atoms, or together with $R^2$ is $R^6$.

$R^2$ is preferably an alkyl, cycloalkyl or aralkyl radical which has 1 to 12 carbon atoms, especially 1 to 8 carbon atoms, and optionally contains an ether oxygen or tertiary amine nitrogen, or together with $R^1$ is $R^6$.

The amidine or guanidine of the formula HZ or HX-A-Z is preferably selected from the group consisting of an amidine of the formula HZ, an amidine of the formula HX-A-Z and a guanidine of the formula HX-A-Z. These amidines or guanidines are preparable from readily obtainable starting materials in a simple process.

A guanidine of the formula HZ, by contrast, is obtainable only via a complex process by means of reaction with ammonia and is therefore not preferred.

Particular preference is given to an amidine of the formula HZ. It is obtainable in a particularly simple manner, and shows catalytic activity which is not very sensitive to disturbance resulting from impurities in the case of use in a curable composition.

Particular preference is further given to a guanidine of the formula HX-A-Z. It is obtainable in a particularly simple manner and shows particularly high catalytic activity.

In one embodiment, Z is an aliphatic amidine group. In this case, $R^3$ is a hydrogen radical or an alkyl or cycloalkyl or aralkyl radical having 1 to 12 carbon atoms.

A reaction product having amidine groups has the advantage that, when used as a catalyst, it does not have quite as high a catalytic activity and can therefore be used in a somewhat higher amount, which means that it is less prone to disturbance resulting from other constituents of a composition, especially the impurities present therein.

If Z represents an amidine group, $R^3$ is preferably a hydrogen radical or an alkyl radical having 1 to 4 carbon atoms, more preferably a hydrogen radical or methyl radical.

If Z represents an amidine group, $R^1$ is preferably an alkyl radical having 1 to 4 carbon atoms or together with $R^2$ is $R^6$.

More preferably, $R^1$ and $R^2$ together are $R^6$.

Thus, Z more preferably represents an amidine group of the formula

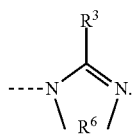

Such a reaction product is preparable in a particularly simple manner.

$R^6$ preferably has 2 to 6 carbon atoms.

$R^6$ is preferably 1,2-ethylene, 1,2-propylene, 1,3-propylene, 2-methyl-1,2-propylene, 2,2-dimethyl-1,3-propylene, 1,3-butylene, 1,4-butylene, 1,3-pentylene, 1,2-cyclohexylene, 1,3-cyclohexylene or 2(4)-methyl-1,3-cyclohexylene, especially 1,2-ethylene, 1,2-propylene, 1,3-propylene, 2-methyl-1,2-propylene, 2,2-dimethyl-1,3-propylene, 1,3-butylene or 1,3-pentylene, more preferably 1,2-ethylene or 1,3-propylene, most preferably 1,3-propylene.

Most preferably, $R^3$ is methyl and $R^6$ is 1,3-propylene. Such an amidine has particularly high catalytic activity and is preparable in a particularly simple manner.

In a further embodiment, Z is an aliphatic guanidine group. In this case, $R^3$ is —$NR^4R^5$.

A reaction product having guanidine groups has the advantage that it has a particularly high catalytic activity when used as a catalyst.

If Z represents a guanidine group, $R^1$ and $R^0$ are preferably each a hydrogen radical.

$R^4$ is preferably a hydrogen radical.

$R^5$ is preferably an alkyl, cycloalkyl or aralkyl radical which has 1 to 12 carbon atoms, especially 1 to 8 carbon atoms, and optionally contains an ether oxygen or tertiary amine nitrogen.

More preferably, $R^1$, $R^0$ and $R^4$ are each a hydrogen radical and $R^2$ and $R^5$ are each independently an alkyl, cycloalkyl or aralkyl radical which has 1 to 12 carbon atoms, especially 1 to 8 carbon atoms, and optionally contains an ether oxygen or tertiary amine nitrogen.

Thus, Z more preferably represents a guanidine group of the formula

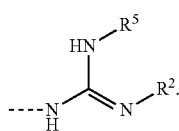

Such a reaction product is preparable in a particularly simple manner and in high purity.

At the same time, $R^2$ and $R^5$ are preferably each independently ethyl, isopropyl, tert-butyl, 3-(dimethylamino)propyl or cyclohexyl, especially isopropyl or cyclohexyl.

Such a reaction product preferably has, as $R^7$, a hydrogen radical or an alkyl or cycloalkyl radical having 1 to 8 carbon atoms or an N,N-dimethylaminopropyl radical or a radical of the formula

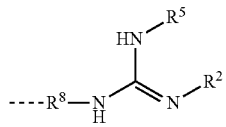

where $R^8$ is an optionally branched alkyl radical having 2 to 6 carbon atoms, especially 1,2-ethylene, 1,3-propylene or 1,6 cyclohexylene, and $R^2$ and $R^5$ have the definitions already given.

A is preferably a divalent hydrocarbyl radical which has 2 to 20 carbon atoms and optionally contains ether oxygen or secondary or tertiary amine nitrogen. More preferably, A is either selected from the group consisting of 1,2-ethylene, 1,2-propylene, 1,3-propylene, 1,3-pentylene, 2-methyl-1,5-pentylene, 1,6-hexylene, 2,2(4),4-trimethyl-1,6-hexamethylene, 1,8-octylene, 1,12-dodecylene, (1,5,5-trimethylcyclohexan-1-yl)methane-1,3, 1,3-cyclohexylenebis(methylene), 1,4-cyclohexylenebis(methylene), 1,3-phenylenebis(methylene), 2(4)-methyl-1,3-cyclohexylene, N-methyl-4-aza-1,7-heptylene, 3-oxa-1,5-pentylene, 3,6-dioxa-1,8-octylene, 4,7-dioxa-1,10-decylene and a polyoxypropylene radical having a mean molecular weight in the range from about 200 to 250 g/mol, or A together with $R^7$ including the nitrogen atom of X is a radical selected from the group consisting of piperidin-4-ylmethyl, 2-(piperidin-4-yl)ethyl and 2-piperazinoethyl.

If A together with $R^7$ including the nitrogen atom of X is piperidin-4-ylmethyl or 2-(piperidin-4-yl)ethyl or 2-piperazinoethyl, the amidine or guanidine of the formula HX-A-Z has the formula

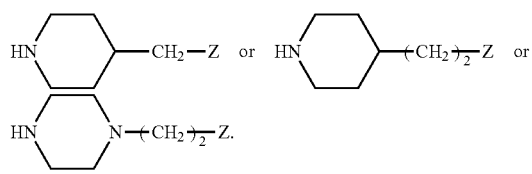

X is preferably $NR^7$.

$R^7$ is preferably a hydrogen radical.

$R^7$ is further preferably an alkyl or cycloalkyl radical having 1 to 8 carbon atoms.

$R^7$ is further preferably a radical of the formula $—R^8—Z$ where $R^8$ is an optionally branched alkylene radical having 2 to 6 carbon atoms, especially 1,2-ethylene, 1,3-propylene or 1,6-hexylene, and Z has the definitions given. $R^7$ is further preferably an N,N-dimethylaminopropyl radical.

$R^7$ is further preferably, together with A and with inclusion of the nitrogen atom of X, piperidin-4-ylmethyl or 2-(piperidin-4-yl)ethyl or 2-piperazinoethyl.

Preferably, q is 2.

P is preferably a q-valent polysiloxane radical having 3 to 50, especially 4 to 25, silicon atoms. Such a reaction product has a particularly high catalytic activity.

P preferably has an average molecular weight in the range from 200 to 4'000 g/mol, especially 280 to 2'000 g/mol.

More preferably, P is a divalent polysiloxane radical of the formula (IVa) or a monovalent polysiloxane radical of the formula (IVb)

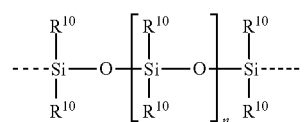

(IVa)

(IVb)

where
$R^{10}$ is independently a monovalent hydrocarbyl radical having 1 to 12, especially 1 to 6, carbon atoms, preferably methyl or phenyl, especially methyl.
$R^{13}$ is a hydroxyl radical or a monovalent hydrocarbyl radical having 1 to 12 carbon atoms, preferably methyl, and n is an integer from 1 to 48, especially 2 to 23.

Most preferably, P is a divalent polysiloxane radical of the formula (IVa). Such a reaction product has a particularly high catalytic activity.

L is preferably an alkylene radical having 1 to 8, preferably 1 to 6, carbon atoms, more preferably 1,3-propylene.

Q is a reactive group selected from glycidoxy, N-aziridinyl, 1,3-keto ester, 1,3-keto amide, (meth)acrylate and (meth)acrylamide.

Glycidoxy is a reactive group of the formula

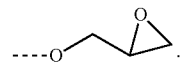

N-Aziridinyl is especially a reactive group of the formula

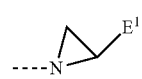

where $E^1$ is a hydrogen radical or a methyl radical.

1,3-keto ester or 1,3-keto amide are especially a reactive group of the formula

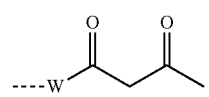

where W is O or $NR^{14}$ and $R^{14}$ is a hydrogen radical or a monovalent hydrocarbyl radical having 1 to 8 carbon atoms. (Meth)acrylate or (meth)acrylamide are especially a reactive group of the formula

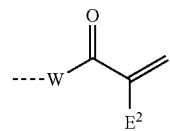

where $E^2$ is a hydrogen radical or a methyl radical and W has the definitions already given.

Preferably, W is O.

Q is preferably glycidoxy, (meth)acrylate or (meth)acrylamide, especially glycidoxy or (meth)acrylate.

Particular preference is given to a reaction product obtained from the reaction of at least one amidine of the formula HZ with at least one polysiloxane of the formula (II) in which Q is glycidoxy.

Particular preference is further given to a reaction product obtained from the reaction of at least one amidine of the formula HZ with at least one polysiloxane of the formula (II) in which Q is (meth)acrylate.

In addition, particular preference is given to a reaction product obtained from the reaction of at least one amidine or guanidine of the formula HX-A-Z, especially a guanidine of the formula HX-A-Z, with at least one polysiloxane of the formula (II) in which Q is glycidoxy.

In addition, particular preference is given to a reaction product obtained from the reaction of at least one amidine or guanidine of the formula HX-A-Z, especially a guanidine of the formula HX-A-Z, with at least one polysiloxane of the formula (II) in which Q is (meth)acrylate.

The preferred reaction products are preparable from readily obtainable starting materials in a particularly simple manner and/or have particularly high catalytic activity.

The reaction product of the invention especially contains compounds of the formula (I)

$$[Q\text{-}L\text{-}]_{(q\text{-}r)}P\text{+}[\text{-}L\text{-}Q'\text{-}Y]_r \qquad (I)$$

where
Y is Z or is —X-A-Z
Q' is a divalent connecting unit formed from the reaction of a reactive Q group with HY,
r is 1 or 2, where (q-r) is 0 or 1,
and q, Q, L, P, X, A and Z have the definitions already given.

The invention thus further provides a compound of the formula (I).

Preferably, (q-r) is 0. The compound of the formula (I) is thus preferably free of reactive Q groups.

Q' is preferably selected from the group consisting of

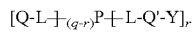

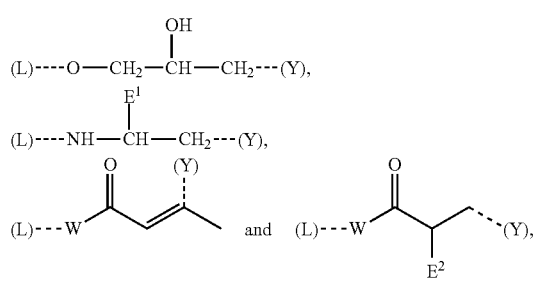

where W, $E^1$ and $E^2$ have the definitions already given.

The letters (L) and (Y) between brackets represent the bond from Q' to L and Y respectively.

If Q' is

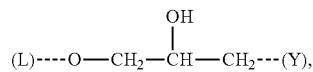

Q' has formed from the reaction of an amidine or guanidine of the formula HZ or HX-A-Z with a glycidoxy group.

If Q' is

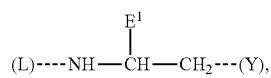

Q' has formed from the reaction of an amidine or guanidine of the formula HZ or HX-A-Z with an N-aziridinyl group.

If Q' is

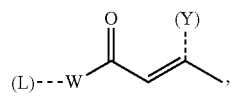

Q' has formed from the reaction of an amidine or guanidine of the formula HX-A-Z with a 1,3-keto ester or 1,3-keto amide group where X is NH.

If Q' is

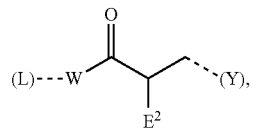

Q' has formed from the reaction of an amidine or guanidine of the formula HZ or HX-A-Z with a (meth)acrylate or (meth)acrylamide group.

More preferably, Q' is

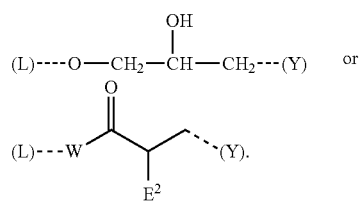

Particularly preferred compounds of the formula (I) have the following formulae (Ia) to (If).

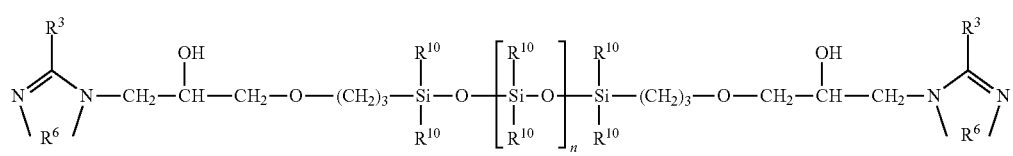

(Ia)

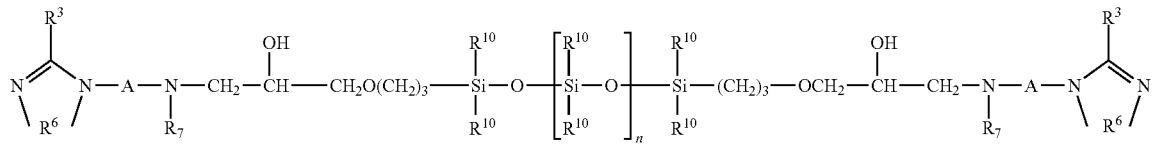
(Ib)
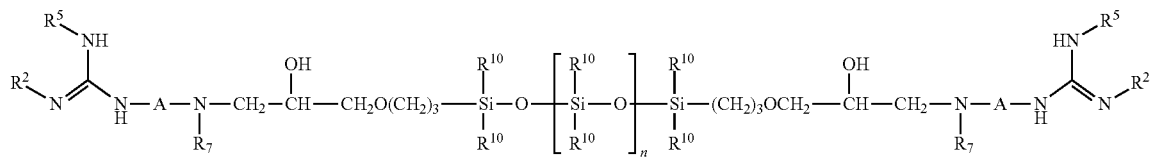
(Ic)
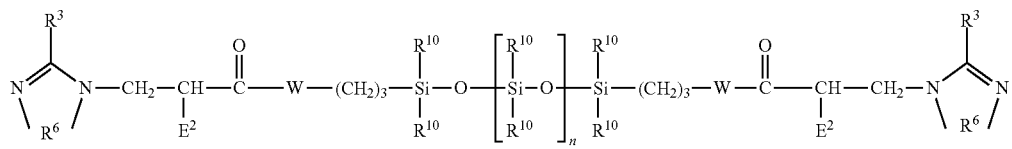
(Id)
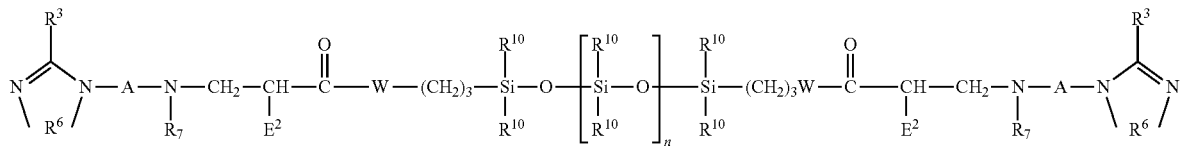
(Ie)
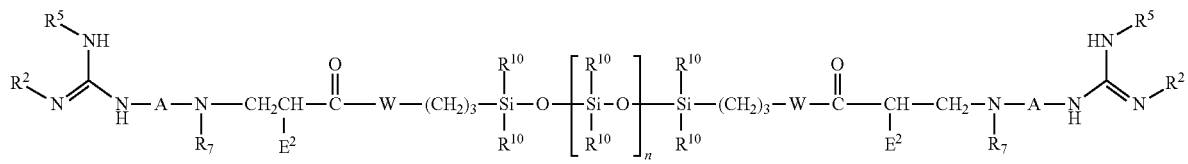
(If)
The compound of the formula (Ia) has formed via the reaction of an amidine of the formula
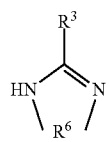
with a polysiloxane of the formula
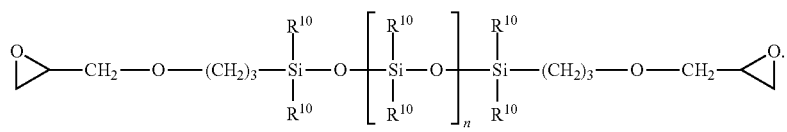

The compound of the formula (Ib) has formed via the reaction of an amidine of the formula

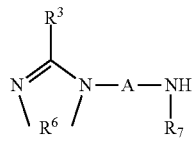

with a polysiloxane of the formula

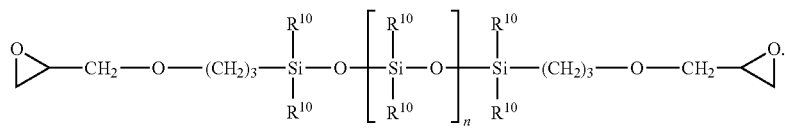

The compound of the formula (Ic) has formed via the reaction of a guanidine of the formula

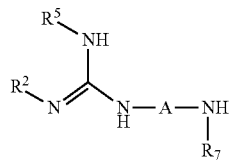

with a polysiloxane of the formula

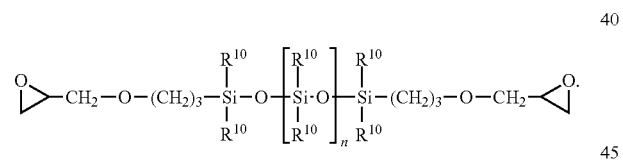

The compound of the formula (Id) has formed via the reaction of an amidine of the formula

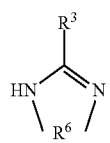

with a polysiloxane of the formula

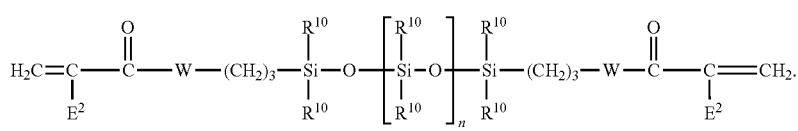

The compound of the formula (Ie) has formed via the reaction of an amidine of the formula

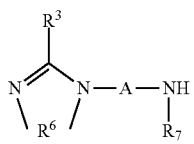

with a polysiloxane of the formula

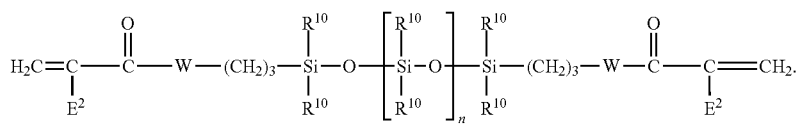

The compound of the formula (If) has formed via the reaction of a guanidine of the formula

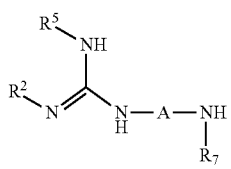

with a polysiloxane of the formula

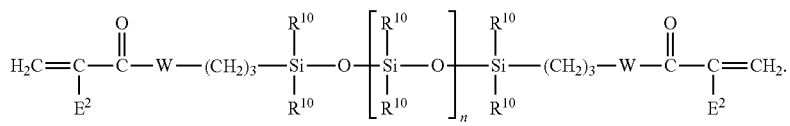

A particularly suitable amidine or guanidine of the formula HZ or HX-A-Z is an amidine of the formula (IIIa)

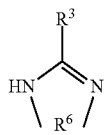
(IIIa)

where $R^3$ is especially a hydrogen radical or methyl radical, and $R^6$ has the definitions already given.

Preferably, the amidine of the formula (IIIa) is selected from the group consisting of imidazoline, 2-methylimidazoline, 4(5)-methylimidazoline, 2,4(5)-dimethylimidazoline, 4,4(5,5)-dimethylimidazoline, 2,4,4(2,5,5)-trimethylimidazoline, 1,4,5,6-tetrahydropyrimidine, 2-methyl-1,4,5,6-tetrahydropyrimidine, 5,5-dimethyl-1,4,5,6-tetrahydropyrimidine, 2,5,5-trimethyl-1,4,5,6-tetrahydropyrimidine, 4(6)-methyl-1,4,5,6-tetrahydropyrimidine, 2,4(2,6)-dimethyl-1,4,5,6-tetrahydropyrimidine, 4(6)-ethyl-1,4,5,6-tetrahydropyrimidine and 4(6)-ethyl-2-methyl-1,4,5,6-tetrahydropyrimidine. Among these, preference is given to 2-methyl-1,4,5,6-tetrahydropyrimidine.

A further particularly suitable amidine or guanidine of the formula HZ or HX-A-Z is an amidine of the formula (IIIb)

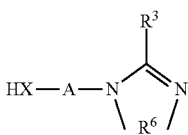
(IIIb)

where $R^3$ is especially a hydrogen radical or methyl radical, and $R^6$, A and X have the definitions already given.

Preferably, the amidine of the formula (IIIb) is selected from the group consisting of 1-(2-aminoethyl)imidazoline, 1-(2-aminoethyl)-2-methylimidazoline, 1-(3-aminopropyl)imidazoline, 1-(3-aminopropyl)-2-methylimidazoline, 1-(2-aminoethyl)-1,4,5,6-tetrahydropyrimidine, 1-(2-aminoethyl)-2-methyl-1,4,5,6-tetrahydropyrimidine, 1-(3-aminopropyl)-1,4,5,6-tetrahydropyrimidine, 1-(3-aminopropyl)-2-methyl-1,4,5,6-tetrahydropyrimidine and bis(2-(2-methyl-4,5-dihydro-1H-imidazol-1-yl)ethyl)amine.

Among these, preference is given to 1-(2-aminoethyl)-2-methyl-1,4,5,6-tetrahydropyrimidine or 1-(3-aminopropyl)-2-methyl-1,4,5,6-tetrahydropyrimidine.

A further particularly suitable amidine or guanidine of the formula HZ or HX-A-Z is a guanidine of the formula (IIIc)

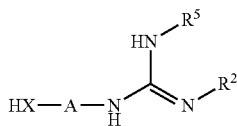
(IIIc)

where $R^2$ and $R^5$ are especially each independently an alkyl, cycloalkyl or aralkyl radical which has 1 to 12 carbon atoms, preferably 1 to 8 carbon atoms, and optionally contains an ether oxygen or tertiary amine nitrogen, and X and A have the definitions already given.

Preferably, the guanidine of the formula (IIIc) is selected from the group consisting of 1-(2-aminoethyl)-2,3-diisopropylguanidine, 1-(2-aminoethyl)-2,3-dicyclohexylguanidine, 1-(2-aminopropyl)-2,3-diisopropylguanidine, 1-(2-aminopropyl)-2,3-dicyclohexylguanidine, 1-(3-aminopropyl)-2,3-diisopropylguanidine, 1-(3-aminopropyl)-2,3-dicyclohexylguanidine, 1-(2-methylaminoethyl)-2,3-diisopropylguanidine, 1-(2-methylaminoethyl)-2,3-dicyclohexylguanidine, 1-(2-ethylaminoethyl)-2,3-diisopropylguanidine, 1-(2-ethylaminoethyl)-2,3-dicyclohexylguanidine, 1-(2-cyclohexylaminoethyl)-2,3-diisopropylguanidine, 1-(2-cyclohexylaminoethyl)-2,3-dicyclohexylguanidine, 1-(3-methylaminopropyl)-2,3-diisopropylguanidine, 1-(3-methylaminopropyl)-2,3-dicyclohexylguanidine, 1-(3-ethylaminopropyl)-2,3-diisopropylguanidine, 1-(3-ethylaminopropyl)-2,3-dicyclohexylguanidine, 1-(3-cyclohexylaminopropyl)-2,3-diisopropylguanidine, 1-(3-cyclohexylaminopropyl)-2,3-dicyclohexylguanidine, 1-(3-aminopentyl)-2,3-diisopropylguanidine, 1-(3-aminopentyl)-2,3-dicyclohexylguanidine, 1-(5-amino-4-methylpentyl)-2,3-diisopropylguanidine, 1-(5-amino-4-methylpentyl)-2,3-dicyclohexylguanidine, 1-(5-amino-2-methylpentyl)-2,3-diisopropylguanidine, 1-(5-amino-2-methylpentyl)-2,3-dicyclohexylguanidine, 1-(6-aminohexyl)-2,3-diisopropylguanidine, 1-(6-aminohexyl)-2,3-dicyclohexylguanidine, 1-(6-amino-2,2(4),4-trimethylhexyl)-2,3-diisopropylguanidine, 1-(6-amino-2,2(4),4-trimethylhexyl)-2,3-dicyclohexylguanidine, 1-(6-amino-3,3(5),5-trimethylhexyl)-2,3-diisopropylguanidine, 1-(6-amino-3,3(5),5-trimethylhexyl)-2,3-dicyclohexylguanidine, 1-(8-aminooctyl)-2,3-diisopropylguanidine, 1-(8-aminooctyl)-2,3-dicyclohexylguanidine, 1-(12-aminododecyl)-2,3-diisopropylguanidine, 1-(12-aminododecyl)-2,3-dicyclohexylguanidine, 1-(3-aminomethyl-3,5,5-trimethylcyclohexyl)-2,3-diisopropylguanidine, 1-(3-aminomethyl-3,5,5-trimethylcyclohexyl)-2,3-dicyclohexylguanidine, 1-(3-amino-1,5,5-trimethylcyclohexylmethyl)-2,3-diisopropylguanidine, 1-(3-amino-1,5,5-trimethylcyclohexylmethyl)-2,3-dicyclohexylguanidine, 1-(3-aminomethylcyclohexylmethyl)-2,3-diisopropylguanidine, 1-(3-aminomethylcyclohexylmethyl)-2,3-dicyclohexylguanidine, 1-(4-aminomethylcyclohexylmethyl)-2,3-diisopropylguanidine, 1-(4-aminomethylcyclohexylmethyl)-2,3-dicyclohexylguanidine, 1-(3-aminomethylbenzyl)-2,3-diisopropylguanidine, 1-(3-aminomethylbenzyl)-2,3-dicyclohexylguanidine, 1-(3-amino-2(4)-methylcyclohexyl)-2,3-diisopropylguanidine, 1-(3-amino-2(4)-methylcyclohexyl)-2,3-dicyclohexylguanidine, 1,1'-(3-aza-1,5-pentylene)bis(2,3-diisopropylguanidine), 1,1'-(3-aza-1,5-pentylene)bis(2,3-dicyclohexylguanidine), 1,1'-(4-aza-1,7-heptylene)bis(2,3-diisopropylguanidine), 1,1'-(4-aza-1,7-heptylene)bis(2,3-dicyclohexylguanidine), 1,1'-(3-aza-1,6-hexylene)bis(2,3-diisopropylguanidine), 1,1'-(3-aza-1,6-hexylene)bis(2,3-dicyclohexylguanidine), 1,1'-(7-aza-1,13-tridecylene)bis(2,3-diisopropylguanidine), 1,1'-(7-aza-1,13-tridecylene)bis(2,3-dicyclohexylguanidine), 1-(piperidin-4-ylmethyl)-2,3-diisopropylguanidine, 1-(piperidin-4-ylmethyl)-2,3-dicyclohexylguanidine, 1-(2-(piperidin-4-yl)ethyl)-2,3-diisopropylguanidine, 1-(2-(piperidin-4-yl)ethyl)-2,3-dicyclohexylguanidine, 1-(2-piperazinoethyl)-2,3-diisopropylguanidine, 1-(2-piperazinoethyl)-2,3-dicyclohexylguanidine, 1-(3-((3-aminopropyl)(methyl)amino)propyl)-2,3-diisopropylguanidine, 1-(3-((3-aminopropyl)(methyl)amino)propyl)-2,3-dicyclohexylguanidine, 1-(3-((3-dimethylaminopropyl)amino)propyl)-2,3-diisopropylguanidine, 1-(3-((3-dimethylaminopropyl)amino)propyl)-2,3-dicyclohexylguanidine, 1-(5-amino-3-oxapentyl)-2,3-diisopropylguanidine, 1-(5-amino-3-oxapentyl)-2,3-dicyclohexylguanidine, 1-(8-amino-3,6-dioxadoctyl)-2,3-diisopropylguanidine, 1-(8-amino-3,6-dioxadoctyl)-2,3-dicyclohexylguanidine, 1-(10-amino-4,7-dioxadecyl)-2,3-diisopropylguanidine, 1-(10-amino-4,7-dioxadecyl)-2,3-dicyclohexylguanidine, 1-(ω-2-aminopropylpolyoxypropylene)-2,3-diisopropylguanidine having a molecular weight in the range from about 320 to 400 g/mol and 1-(ω-2-aminopropylpolyoxypropylene)-2,3-dicyclohexylguanidine having a molecular weight in the range from about 400 to 500 g/mol.

Among these, preference is given to 1-(2-aminopropyl)-2,3-diisopropylguanidine, 1-(2-aminopropyl)-2,3-dicyclohexylguanidine, 1-(3-aminopropyl)-2,3-diisopropylguanidine, 1-(3-aminopropyl)-2,3-dicyclohexylguanidine, 1-(3-cyclohexylaminopropyl)-2,3-diisopropylguanidine, 1-(3-cyclohexylaminopropyl)-2,3-dicyclohexylguanidine, 1-(5-amino-4-methylpentyl)-2,3-diisopropylguanidine, 1-(5-amino-4-methylpentyl)-2,3-dicyclohexylguanidine, 1-(6-amino-3,3(5),5-trimethylhexyl)-2,3-diisopropylguanidine, 1-(6-amino-3,3(5),5-trimethylhexyl)-2,3-dicyclohexylguanidine, 1,1'-(3-aza-1,5-pentylene)bis(2,3-diisopropylguanidine), 1,1'-(3-aza-1,5-pentylene)bis(2,3-dicyclohexylguanidine), 1-(3-((3-dimethylaminopropyl)amino)propyl)-2,3-diisopropylguanidine or 1-(3-((3-dimethylaminopropyl)amino)propyl)-2,3-dicyclohexylguanidine.

The amidine or guanidine of the formula HZ or HX-A-Z is especially obtained from the reaction of at least one primary amine with at least one reagent for introduction of amidine or guanidine groups.

An amidine of the formula (IIIa) is especially obtained from the reaction of at least one primary amine of the formula $NH_2$—$R^6$—$NH_2$ with at least one reagent for introduction of amidine groups.

An amidine of the formula (IIIb) is especially obtained from the reaction of at least one primary amine of the formula HX-A-NH—$R^6$—$NH_2$ with at least one reagent for introduction of amidine groups.

A guanidine of the formula (IIIc) is especially obtained from the reaction of at least one primary amine of the formula HX-A-$NH_2$ with at least one reagent for introduction of guanidine groups.

Suitable primary amines are especially aliphatic primary mercapto amines, especially 2-aminoethanethiol (cysteamine), 3-aminopropanethiol, 4-amino-1-butanethiol, 6-amino-1-hexanethiol, 8-amino-1-octanethiol, 10-amino-1-decanethiol or 12-amino-1-dodecanethiol;

aliphatic, cycloaliphatic or arylaliphatic primary diamines, especially ethylenediamine, propane-1,2- and -1,3-diamine, 2-methylpropane-1,2-diamine, 2,2- dimethylpropane-1,3-diamine, butane-1,3- and -1,4-diamine, pentane-1,3-diamine (DAMP), pentane-1,5-diamine, 1,5-diamino-2-methylpentane (MPMD), 2-butyl-2-ethylpentane-1,5-diamine (C11 neodiamine), hexane-1,6-diamine, 2,5-dimethylhexane-1,6-diamine, 2,2,4- and 2,4,4-trimethylhexamethylenediamine (TMD), heptane-1,7-diamine, octane-1,8-diamine, nonane-1,9-diamine, decane-1,10-diamine, undecane-1,11-diamine, dodecane-1,12-diamine, 1,2-, 1,3- or 1,4-diaminocyclo-hexane, bis(4-aminocyclohexyl) methane, bis(4-amino-3-methylcyclohexyl)-methane, bis(4-amino-3-ethylcyclohexyl)methane, bis(4-amino-3,5-dimethyl-cyclohexyl)methane, bis(4-amino-3-ethyl-5-methylcyclohexyl)methane, 1-amino-3-aminomethyl-3,5,5-trimethylcyclohexane (isophoronediamine or IPD), 2- and/or 4-methyl-1,3-diaminocyclohexane, 1,3- or 1,4-bis(amino-methyl)cyclohexane, 2,5(2,6)-bis(aminomethyl)bicyclo[2.2.1]heptane (NBDA), 3(4),8(9)-bis(aminomethyl)tricyclo[5.2.1.0$^{2,6}$]decane, 1,4-diamino-2,2,6-trimethylcyclohexane (TMCDA), 1,8-menthanediamine, 3,9-bis(3-aminopropyl)-2,4,8,10-tetraoxaspiro[5.5]undecane, 1,3-bis(aminomethyl)benzene, 1,4-bis(aminomethyl)benzene, 4-aminomethyl-1,8-octanediamine, or products from the double cyanoethylation and subsequent reduction of fatty amines derived from natural fatty acids, such as N,N-bis(3-amino-propyl)dodecylamine or N,N-bis(3-aminopropyl)tallowalkylamine, available as Triameen® Y12D or Triameen® YT (from Akzo Nobel);

aliphatic or cycloaliphatic primary diamines containing ether groups, especially bis(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine, cycloaliphatic diamines containing ether groups from the propoxylation and subsequent amination of 1,4-dimethylolcyclohexane, obtainable especially as Jeffamine® RFD-270 (from Huntsman), polyoxyalkyleneamines having a mean molecular weight in the range from 200 to 500 g/mol, as commercially available, for example, under the Jeffamine® trade name (from Huntsman), Polyetheramine (from BASF) and PC Amine® (from Nitroil), characterized in that they bear 2-aminopropyl or 2-aminobutyle end groups, especially Jeffamine® D-230, Jeffamine® D-400, Jeffamine® XTJ-582, Jeffamine® HK-511 or Jeffamine® XTJ-566 (all from Huntsman), or analogous products from BASF and Nitroil;

diamines having one primary and one secondary amino group, especially N-methylethane-1,2-diamine, N-ethylethane-1,2-diamine, N-butylethane-1,2-diamine, N-hexylethane-1,2-diamine, N-(2-ethylhexyl) ethane-1,2-diamine, N-cyclohexylethane-1,2-diamine, 4-aminomethylpiperidine, 4-((2-amino)-ethyl)piperidine, N-methylpropane-1,3-diamine, N-ethylpropane-1,3-diamine, N-butylpropane-1,3-diamine, N-hexylpropane-1,3-diamine, N-(2-ethylhexyl)-propane-1,3-diamine, N-dodecylpropane-1,3-diamine, N-cyclohexylpropane-1,3-diamine, 3-methylamino-1-pentylamine, 3-ethylamino-1-pentylamine, 3-butylamino-1-pentylamine, 3-hexylamino-1-pentylamine, 3-(2-ethylhexyl)-amino-1-pentylamine, 3-dodecylamino-1-pentylamine, 3-cyclohexylamino-1-pentylamine, or 3-aminopropylated fatty amines such as, in particular, N-coco-alkylpropane-1,3-diamine, N-oleylpropane-1,3-diamine, N-soyaalkylpropane-1,3-diamine, N-tallowalkylpropane-1,3-diamine or N—(C$_{16-22}$-alkyl)propane-1,3-diamine, as available, for example, under the Duomeen® trade name (from Akzo Nobel);

polyalkyleneamines and further polyamines having primary and secondary and/or tertiary amino groups, especially diethylenetriamine (DETA), triethylenetetramine (TETA), tetraethylenepentamine (TEPA), pentaethylenehexamine (PEHA), polyethylenepolyamine having 5 to 7 ethyleneamine units (called "higher ethylenepolyamine", HEPA), dipropylenetriamine (DPTA), N-(2-aminoethyl)propane-1,3-diamine (N3 amine), N,N'-bis(3-aminopropyl)ethylenediamine (N4 amine), bishexamethylenetriamine (BHMT), N3-(3-aminopentyl)pentane-1,3-diamine, N5-(3-aminopropyl)-2-methylpentane-1,5-diamine, N5-(3-amino-1-ethylpropyl)-2-methylpentane-1,5-diamine, N-(2-aminoethyl)piperazine, N-(2-aminopropyl)piperazine, N$^1$-((3-dimethylamino)propyl)-1,3-diaminopropane, N-methyl-N'-(2-aminoethyl)ethane-1,2-diamine, N-methyl-N'-(3-aminopropyl)ethane-1,2-diamine, N-methyl-N'-(2-aminoethyl)propane-1,3-diamine or N-methyl-N'-(3-aminopropyl)propane-1,3-diamine.

Preferably, the primary amine is selected from the group consisting of ethylenediamine, 1,2-propanediamine, 1,3-propanediamine, 2-methyl-1,2-propanediamine, 2,2-dimethyl-1,3-propanediamine, N-methyl-1,2-ethanediamine, N-ethyl-1,2-ethanediamine, N-cyclohexyl-1,2-ethanediamine, N-methyl-1,3-propanediamine, N-ethyl-1,3-propanediamine, N-cyclohexyl-1,3-propanediamine, 1,3-butanediamine, 1,3-pentanediamine (DAMP), 1,5-diamino-2-methylpentane (MPMD), 1,6-hexanediamine, 2,2(4),4-trimethylhexamethylenediamine (TMD), 1,8-octanediamine, 1,12-dodecanediamine, 1-amino-3-aminomethyl-3,5,5-trimethylcyclohexane (IPD), 1,3-bis(aminomethyl)cyclohexane, 1,4-bis(aminomethyl)cyclohexane, 1,3-bis(aminomethyl)benzene, 2(4)-methyl-1,3-diaminocyclohexane, diethylenetriamine, tetraethylenepentamine, dipropylenetriamine, N-(2-aminoethyl)-1,3-propanediamine (N3-Amin), bis(hexamethylene)triamine (BHMT), 4-aminomethylpiperidine, 4-((2-amino)ethyl)piperidine, N-(2-aminoethyl)piperazine, N'-methyl-N'-(3-aminopropyl)-1,3-propanediamine, N$^1$-((3-dimethylamino)propyl)-1,3-diaminopropane, bis(2-aminoethyl) ether, 3,6-dioxaoctane-1,8-diamine, 4,7-dioxadecane-1,10-diamine and polyoxypropylenediamines having an average molecular weight in the range from about 220 to 250 g/mol, such as, in particular, Jeffamine® D-230.

Suitable reagents for introducing amidine groups are especially orthoesters, 1,3-keto esters, 1,3-keto amides, nitriles, imide acid esters, imide acid chlorides, amides or lactams.

Orthoesters, 1,3-keto esters or nitriles are particularly suitable, especially trimethyl orthoformate, triethyl orthoformate, trimethyl orthoacetate, triethyl orthoacetate, methyl acetoacetate, ethyl acetoacetate, isopropyl acetoacetate, tert-butyl acetoacetate or acetonitrile.

The conversion to the amidine is preferably conducted at elevated temperature, optionally under elevated pressure and optionally in the presence of a catalyst, wherein elimination products released from the reagent, such as alcohols, esters or amines, are preferably removed during or after the reaction, especially by means of distillation, optionally under reduced pressure. Preferably, the reagent is fully converted in the conversion.

Suitable reagents for introduction of guanidine groups are cyanamides, carbodiimides, ureas, O-alkylisoureas, thioureas, S-alkylisothioureas, aminoiminomethanesulfonic acids, guanylpyrazoles or guanidines. Cyanamides or carbodiimides are particularly suitable, especially carbodiimides.

An especially suitable carbodiimide is one of the formula $R^5N=C=NR^2$ where $R^2$ and $R^5$ are especially each independently an alkyl, cycloalkyl or aralkyl radical which has 1 to 12 carbon atoms, especially 1 to 8 carbon atoms, and optionally contains an ether oxygen or tertiary amine nitrogen.

Particular preference is given to N,N'-diisopropylcarbodiimide (DIC), N,N'-di-tert-butylcarbodiimide, N,N'-dicyclohexylcarbodiimide (DCC) or N-ethyl-N'-(3-dimethylaminopropyl)carbodiimide (EDC), especially N,N'-diisopropylcarbodiimide (DIC) or N,N'-dicyclohexylcarbodiimide (DCC).

The conversion to the guanidine is preferably conducted at elevated temperature, optionally under elevated pressure and optionally in the presence of a catalyst, wherein elimination products released from the reagent are preferably removed during or after the reaction. Preferably, the reagent is fully converted in the conversion.

The reaction with a carbodiimide is preferably effected at a temperature of 40 to 160° C., especially 60 to 140° C. Optionally, a carboxylic acid or Lewis acid is used here as a catalyst, especially boron trifluoride etherate, lithium perchlorate, zinc chloride, zinc triflate or lanthanum triflate.

A polysiloxane of the formula (II) suitable for the reaction is especially a commercially available polysiloxane having reactive Q groups. Preference is given to glycidoxy-functional silicone oils such as, in particular, Tegomer® E-Si 2330 (from Evonik) or X-22-163, X-22-163A or LF-105 (all from Shin Etsu) or Silmer® EP Di-25 (from Siltech), or methacrylate-functional silicone oils such as, in particular, Silaplan® FM-7711 (from Chisso) or X-22-164, X-22-164A or X-22-164AS (all from Shin Etsu).

A further suitable polysiloxane of the formula (II) is especially a polysiloxane obtained from the reaction of a hydroxyalkyl- or aminoalkyl-functional polysiloxane of the formula $P-[L-OH]_q$ or $P-[L-NH_2]_q$ in which P, L and q have the definitions already given with an acetoacetate, releasing an alcohol to give a polysiloxane of the formula (II) having 1,3-keto ester or 1,3-keto amide as reactive Q groups.

A further suitable polysiloxane of the formula (II) is especially a polysiloxane obtained from the reaction of a siloxane or polysiloxane of the formula (V)

where $P^1$ is a q-valent siloxane or polysiloxane radical having 2 to 98 silicon atoms and q has the definitions already given with a Q-functional silane of the formula (VI)

where
$L^1$ is an alkylene radical having 1 to 12 carbon atoms,
$R^{12}$ is an alkyl radical which has 1 to 12, especially 1 to 6, carbon atoms and optionally contains ether oxygen, preferably methyl or ethyl or isopropyl, especially methyl or ethyl,
and Q and $R^{10}$ have the definitions already given,
with release of alcohol $HOR^{12}$.

Q here is especially glycidoxy or (meth)acrylate.
$L^1$ is preferably an alkylene radical having 1 to 8, preferably 1 to 6, carbon atoms, especially 1,3-propylene.
$P^1$ has preferably 2 to 48, especially 2 to 23, silicon atoms.
More preferably, the siloxane or polysiloxane of the formula (V) has the formula

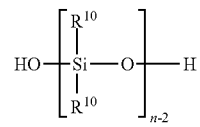

where n and $R^{10}$ have the definitions already given.

This reaction is preferably conducted at a temperature in the range from 0 to 140° C., especially 20 to 120° C., preferably with removal of the alcohol $HOR^{12}$ released from the reaction mixture, especially by means of distillation under reduced pressure.

The silane of the formula (VI) is preferably used in a roughly stoichiometric or slightly superstoichiometric amount in relation to the OH groups of the siloxane or polysiloxane of the formula (V).

A suitable silane of the formula (VI) is especially 3-glycidoxypropylmethoxydimethylsilane, 3-glycidoxypropylethoxydimethylsilane, 3-acryloyloxypropylmethoxydimethylsilane, 3-acryloyloxypropylethoxydimethylsilane, 3-methacryloyloxypropylmethoxydimethylsilane or 3-methacryloyloxypropylethoxydimethylsilane.

Suitable siloxanes or polysiloxanes of the formula (V) are commercially available, for example as X-21-5841 (from Shin Etsu) or Silaplan® FM-4411 (from Chisso).

Reaction products containing compounds of the formula (I) are also available in that at least one amidine or guanidine of the formula HZ or HX-A-Z is first reacted with the Q-functional silane of the formula (VI) to give a Y-functional silane of the formula (VII)

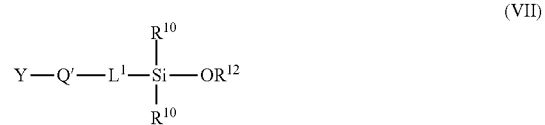

and the latter is then reacted with at least one polysiloxane of the formula (V) with release of the alcohol $HOR^{12}$.

The reaction product of the invention may, as well as compounds of the formula (I), contain proportions of by-products or unconverted starting materials. The reaction may be followed by further workup or, preferably, use without workup or purification.

The invention further provides for the use of the reaction product of the invention as catalyst for the crosslinking of a curable composition. In this case, it accelerates the crosslinking or curing of the composition.

A suitable curable composition is especially an epoxy resin composition, especially a high-temperature-curing system that crosslinks via dicyandiamide or carboxylic acids or carboxylic anhydrides, as used, for example, in adhesives, coatings or casting resins; or a polyurethane composition, especially a two-component system that crosslinks by reaction of polyols with isocyanates, as used, for example, for adhesives, coverings, potting compounds, sealing joints, moldings or slabstock foams, or a one-component system having blocked isocyanate groups or blocked amino groups, as used, for example, in powder coatings, coil coatings, electrocoat materials or liquid paints; or an epoxy resin/polyurethane composition; or a cyanate ester resin composition; or a composition containing silane groups.

A particularly advantageous use is for crosslinking of a composition containing silane groups, especially of a composition based on polymers containing silane groups. Compositions based on polymers containing silane groups cure rapidly even when the content of the reaction product of the invention is relatively low and do not have a tendency to migration-related defects such as separation, exudation or substrate soiling.

Particular preference is given to the use of the reaction product of the invention as catalyst for the crosslinking of a composition based on polymers containing silane groups, especially selected from the group consisting of polyorganosiloxanes having terminal silane groups and organic polymers containing silane groups, as described more particularly hereinafter.

A polyorganosiloxane having terminal silane groups has the advantage that it is particularly water- and light-stable and enables particularly flexible properties. An organic polymer containing silane groups has the advantage of having particularly good adhesion properties on a multitude of substrates and being particularly inexpensive.

More preferably, the polymer containing silane groups is a polyorganosiloxane having terminal silane groups. The reaction product of the invention has very particularly good compatibility with such a composition.

The invention thus further provides a composition comprising at least one polymer containing silane groups and at least one reaction product as described above.

A composition of this kind has good storability with no propensity to separation, and because of the low toxicity and low volatility of the reaction product of the invention allows a low hazard classification and enables low-emissions and low-odor products that cure surprisingly quickly and at the same time form a mechanically high-quality and durable material. It is a particularly advantageous circumstance here that this material has barely any tendency to migration-related defects such as bleeding or substrate soiling. By contrast, compositions comprising amidine or guanidine catalysts according to the prior art, for example DBU or TMG, have a propensity to migration effects, which can be manifested prior to curing by separation and after curing by tacky and/or greasy surfaces and/or substrate soiling. Particularly the latter effects are extremely undesirable, since tacky and greasy surfaces are rapidly soiled and are difficult to paint over, and substrate soiling can lead to lasting discoloration.

In a particularly preferred embodiment, the polymer containing silane groups is a polyorganosiloxane having terminal silane groups.

A preferred polyorganosiloxane having terminal silane groups has the formula (VIII)

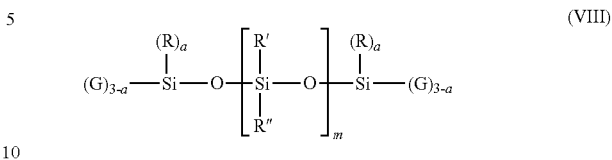

where

R, R' and R" are each independently a monovalent hydrocarbyl radical having 1 to 12 carbon atoms;

G is a hydroxyl radical or an alkoxy, acetoxy, ketoximato, amido or enoxy radical having 1 to 13 carbon atoms;

a is 0, 1 or 2; and m is an integer in the range from 50 to about 2'500.

R is preferably methyl, vinyl or phenyl.

R' and R" are preferably each independently an alkyl radical having 1 to 5, preferably 1 to 3, carbon atoms, especially methyl.

G is preferably a hydroxyl radical or an alkoxy or ketoximato radical having 1 to 6 carbon atoms, especially a hydroxyl, methoxy, ethoxy, methylethylketoximato or methylisobutylketoximato radical.

More preferably, G is a hydroxyl radical.

a is preferably 0 or 1, especially 0.

In addition, m is preferably chosen such that the polyorganosiloxane of the formula (VIII) has a viscosity at room temperature in the range from 100 to 500'000 mPa·s, especially from 1000 to 100'000 mPa·s.

Polyorganosiloxanes of the formula (VIII) are easy to handle and crosslink with moisture and/or silane crosslinkers to give solid silicone polymers having elastic properties.

Suitable commercially available polyorganosiloxanes of the formula (VIII) are available, for example, from Wacker, Momentive Performance Material, GE Advanced Materials, Dow Corning, Bayer or Shin Etsu.

Preferably, the composition comprises, in addition to the polyorganosiloxane having terminal silane groups, a silane crosslinker, especially a silane of the formula (IX)

where

R''' is a monovalent hydrocarbyl radical having 1 to 12 carbon atoms,

G' is a hydroxyl radical or is an alkoxy, acetoxy, ketoximato, amido or enoxy radical having 1 to 13 carbon atoms; and p has a value of 0, 1 or 2, especially 0 or 1.

Particularly suitable silanes of the formula (IX) are methyltrimethoxysilane, ethyltrimethoxysilane, propyltrimethoxysilane, vinyltrimethoxysilane, methyltriethoxysilane, vinyltriethoxysilane, phenyltriethoxysilane, tetramethoxysilane, tetraethoxysilane, methyltris(methylethylketoximo)silane, vinyltris(methylethylketoximo)silane and methyltris(isobutylketoximo)silane.

In a further preferred embodiment, the polymer containing silane groups is an organic polymer containing silane groups, especially a polyolefin, polyester, polyamide, poly(meth)acrylate or polyether or a mixed form of these polymers, each of which bears one or preferably more than one silane group. The silane groups may be in pendant positions in the chain or in terminal positions and are bonded to the organic polymer via a carbon atom.

More preferably, the organic polymer containing silane groups is a polyolefin containing silane groups or a polyester containing silane groups or a poly(meth)acrylate containing silane groups or a polyether containing silane groups or a mixed form of these polymers.

Most preferably, the organic polymer containing silane groups is a polyether containing silane groups.

The silane groups present in the organic polymer containing silane groups are preferably alkoxysilane groups, especially alkoxysilane groups of the formula (X)

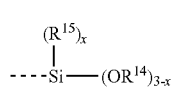

where
$R^{14}$ is a linear or branched, monovalent hydrocarbyl radical having 1 to 5 carbon atoms, especially methyl or ethyl or isopropyl;
$R^{15}$ is a linear or branched, monovalent hydrocarbyl radical having 1 to 8 carbon atoms, especially methyl or ethyl; and
x is a value of 0 or 1 or 2, preferably 0 or 1, especially 0.

More preferably $R^{14}$ is methyl or ethyl.

For particular applications, the $R^{14}$ radical is preferably an ethyl group, since, in this case, ecologically and toxicologically harmless ethanol is released in the course of curing of the composition.

Particular preference is given to trimethoxysilane groups, dimethoxymethylsilane groups or triethoxysilane groups.

In this context, methoxysilane groups have the advantage that they are particularly reactive, and ethoxysilane groups have the advantage that they are toxicologically advantageous and particularly storage-stable.

The organic polymer containing silane groups has an average of preferably 1.3 to 4, especially 1.5 to 3, more preferably 1.7 to 2.8, silane groups per molecule. The silane groups are preferably terminal.

The organic polymer containing silane groups preferably has a mean molecular weight, determined by means of GPC against a polystyrene standard, in the range from 1'000 to 30'000 g/mol, especially from 2'000 to 20'000 g/mol. The organic polymer containing silane groups preferably has a silane equivalent weight of 300 to 25'000 g/eq, especially of 500 to 15'000 g/eq.

The organic polymer containing silane groups may be solid or liquid at room temperature. It is preferably liquid at room temperature.

Most preferably, the organic polymer containing silane groups is a polyether containing silane groups which is liquid at room temperature, where the silane groups are especially dialkoxysilane groups and/or trialkoxysilane groups, more preferably trimethoxysilane groups or triethoxysilane groups.

Processes for preparing polyethers containing silane groups are known to the person skilled in the art.

In a preferred process, polyethers containing silane groups are obtainable from the reaction of polyethers containing allyl groups with hydrosilanes, optionally with chain extension using, for example, diisocyanates.

In a further preferred process, polyethers containing silane groups are obtainable from the copolymerization of alkylene oxides and epoxysilanes, optionally with chain extension using, for example, diisocyanates.

In a further preferred process, polyethers containing silane groups are obtainable from the reaction of polyether polyols with isocyanatosilanes, optionally with chain extension using diisocyanates.

In a further preferred process, polyethers containing silane groups are obtainable from the reaction of polyethers containing isocyanate groups, especially NCO-terminated urethane polyethers from the reaction of polyether polyols with a superstoichiometric amount of polyisocyanates, with aminosilanes, hydroxysilanes or mercaptosilanes. Polyethers containing silane groups from this process are particularly preferred. This process enables the use of a multitude of inexpensive starting materials of good commercial availability, by means of which it is possible to obtain different polymer properties, for example high extensibility, high strength, low modulus of elasticity, low glass transition point or high weathering resistance.

Further suitable polyethers containing silane groups are commercially available products, especially the following: MS Polymer™ (from Kaneka Corp.; especially the S203H, S303H, S227, S810, MA903 and S943 products); MS Polymer™ or Silyl™ (from Kaneka Corp.; especially the SAT010, SAT030, SAT200, SAX350, SAX400, SAX725, MAX450, MAX951 products); Excestar® (from Asahi Glass Co. Ltd.; especially the S2410, S2420, S3430, S3630 products); SPUR+* (from Momentive Performance Materials; especially the 1010LM, 1015LM, 1050MM products); Vorasil™ (from Dow Chemical Co.; especially the 602 and 604 products); Desmoseal® (from Bayer MaterialScience AG; especially the S XP 2458, S XP 2636, S XP 2749, S XP 2774 and S XP 2821 products), TEGOPAC® (from Evonik Industries AG; especially the Seal 100, Bond 150, Bond 250 products), Polymer ST (from Hanse Chemie AG/Evonik Industries AG, especially the 47, 48, 61, 61LV, 77, 80, 81 products); Geniosil® STP (from Wacker Chemie AG; especially the E10, E15, E30, E35 products).

More preferably, the composition comprises at least one polymer containing silane groups in the form of a polyorganosiloxane having terminal silane groups.

Preferably, the reaction product is present in the composition in such an amount that the concentration of amidine and guanidine groups from the reaction product, based on the amount of the polymer containing silane groups, is in the range from 0.1 to 20 mmol/100 g of polymer, preferably 0.2 to 15 mmol/100 g of polymer, especially 0.2 to 10 mmol/100 g of polymer.

Such a composition has good storability and rapid curing.

In addition to the reaction product, the composition may comprise further catalysts, especially for the crosslinking of silane groups. Suitable further catalysts are especially metal compounds and/or basic nitrogen or phosphorus compounds.

Suitable metal compounds are especially compounds of tin, titanium, zirconium, aluminum or zinc, especially diorganotin(IV) compounds such as, in particular, dibutyltin(IV) diacetate, dibutyltin(IV) dilaurate, dibutyltin(IV) dineodecanoate or dibutyltin(IV) bis(acetylacetonate) and dioctyltin(IV) dilaurate, and also titanium(IV) or zirconium(IV) or aluminum(III) or zinc(II) complexes, especially with alkoxy, carboxylate, 1,3-diketonate, 1,3-ketoesterate or 1,3-ketoamidate ligands.

Suitable basic nitrogen or phosphorus compounds are especially imidazoles, pyridines, phosphazene bases or preferably amines, hexahydrotriazines, biguanides, guanidines or further amidines.

Suitable amines are, in particular, alkyl-, cycloalkyl- or aralkylamines such as triethylamine, triisopropylamine, 1-butylamine, 2-butylamine, tert-butylamine, 3-methyl-1-butylamine, 3-methyl-2-butylamine, dibutylamine, tributylamine, hexylamine, dihexylamine, cyclohexylamine, dicyclohexylamine, dimethylcyclohexylamine, benzylamine, dibenzylamine, dimethylbenzylamine, octylamine, 2-ethylhexylamine, di-(2-ethylhexyl)amine, laurylamine, N,N-dimethyllaurylamine, stearylamine, N,N-dimethylstearylamine; fatty amines derived from natural fatty acid mixtures, such as, in particular, cocoalkylamine, N,N-dimethylcocoalkylamine, $C_{16-22}$-alkylamine, N,N-dimethyl-$C_{16-22}$-alkylamine, soyaalkylamine, N,N-dimethylsoyaalkylamine, oleylamine, N,N-dimethyloleylamine, tallowalkylamine or N,N-dimethyltallowalkylamine, obtainable for example under the trade names Armeen® (from Akzo Nobel) or Rofamin® (from Ecogreen Oleochemicals); aliphatic, cycloaliphatic or araliphatic diamines such as ethylenediamine, butanediamine, hexamethylenediamine, dodecanediamine, neopentanediamine, 2-methylpentamethylenediamine (MPMD), 2,2(4),4-trimethylhexamethylenediamine (TMD), isophoronediamine (IPD), 2,5(2,6)-bis(aminomethyl)bicyclo[2.2.1]heptane (NBDA), xylylene-1,3-diamine (MXDA), N,N'-di(tert-butyl)ethylenediamine, N,N,N',N'-tetramethylethylenediamine, N,N,N',N'-tetramethylpropylenediamine, N, N, N',N'-tetramethylhexamethylenediamine, 3-dimethylaminopropylamine, 3-(methylamino)propylamine, 3-(cyclohexylamino)propylamine, piperazine, N-methylpiperazine, N,N'-dimethylpiperazine, 1,4-diazabicyclo[2.2.2]octane, fatty polyamines such as N-cocoalkylpropane-1,3-diamine, N-oleylpropane-1,3-diamine, N-soyaalkylpropane-1,3-diamine, N-tallowalkylpropane-1,3-diamine or N—($C_{16-22}$-alkyl)propane-1,3-diamine, obtainable for example under the trade name Duomeen® (from Akzo Nobel); polyalkyleneamines such as diethylenetriamine, dipropylenetriamine, triethylenetetramine (TETA), tetraethylenepentamine (TEPA), pentamethylenehexamine (PEHA), 3-(2-aminoethyl)aminopropylamine, N,N'-bis(3-aminopropyl)ethylenediamine, N-(3-aminopropyl)-N-methylpropanediamine, bis(3-dimethylaminopropyl)amine, N-(3-dimethylaminopropyl)propylene-1,3-diamine, N-(2-aminoethyl)piperazine (N-AEP), N-(2-aminopropyl)piperazine, N,N'-di-(2-aminoethyl)piperazine, 1-methyl-4-(2-dimethylaminoethyl)piperazine, N, N, N',N'',N''-pentamethyldiethylenetriamine, N,N,N',N'',N''-pentamethyldipropylenetriamine, polyethyleneimines obtainable for example under the trade names Lupasol® (from BASF) and Epomin® (from Nippon Shokubai); ether amines, such as, in particular, 2-methoxyethylamine, 2-ethoxyethylamine, 3-methoxypropylamine, 3-ethoxypropylamine, 3-(2-ethylhexyloxy)propylamine, 3-(2-methoxyethoxy)propylamine, 2(4)-methoxyphenylethylamine, morpholine, N-methylmorpholine, N-ethylmorpholine, 2-aminoethylmorpholine, bis(2-aminoethyl) ether, bis(dimethylaminoethyl) ether, bis(dimorpholinoethyl) ether, N,N,N'-trimethyl-N'-hydroxyethylbis(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine, or 2-aminopropyl-terminated glycols, of the kind obtainable for example under the trade name Jeffamine® (from Huntsman); amino alcohols, such as, in particular, ethanolamine, isopropanolamine, diethanolamine, diisopropanolamine, triethanolamine, triisopropanolamine, N-butylethanolamine, diglycolamine, N,N-diethylethanolamine, N-methyldiethanolamine, N-methyldiisopropylamine, N,N,N'-trimethylaminoethylethanolamine, N-(3-dimethylaminopropyl)-N,N-diisopropanolamine, N,N-bis(3-dimethylaminopropyl)-N-isopropanolamine, 2-(2-dimethylaminoethoxy)ethanolamine, or adducts of mono- and polyamines with epoxides or diepoxides; amines containing phenol groups, such as, in particular, condensation products of phenols, aldehydes, and amines (so-called Mannich bases and phenalkamines) such as, in particular, 2-(dimethylaminomethyl)phenol, 2,4,6-tris(dimethylaminomethyl)phenol, or polymers of phenol, formaldehyde, and N,N-dimethylpropane-1,3-diamine, and also phenalkamines obtainable commercially under the brand names Cardolite® (from Cardolite), Aradur® (from Huntsman), and Beckopox® (from Cytec); polyamines containing amide groups, so-called polyamidoamines, of the kind available commercially, for example, under the brand names Versamid® (from Cognis), Aradur® (from Huntsman), Euretek® (from Huntsman) or Beckopox® (from Cytec); or aminosilanes, such as, in particular, 3-aminopropyltrimethoxysilane, 3-aminopropyldimethoxymethylsilane, N-(2-aminoethyl)-3-aminopropyltrimethoxysilane, N-(2-aminoethyl)-3-aminopropyl-methyldimethoxysilane, N-(2-aminoethyl)-N'-[3-(trimethoxysilyl)propyl]ethylenediamine or their analogs with ethoxy rather than the methoxy groups on the silicon.

Suitable hexahydrotriazines are especially 1,3,5-hexahydrotriazine or 1,3,5-tris(3-(dimethylamino)propyl)hexahydrotriazine.

Suitable biguanides are especially biguanide, 1-butylbiguanide, 1,1-dimethylbiguanide, 1-butylbiguanide, 1-phenylbiguanide or 1-(o-tolyl)biguanide (OTBG).

Suitable further guanidines are especially 1-butylguanidine, 1,1-dimethylguanidine, 1,3-dimethylguanidine, 1,1,3,3-tetramethylguanidine (TMG), 2-(3-(trimethoxysilyl)propyl)-1,1,3,3-tetramethylguanidine, 2-(3-(methyldimethoxysilyl)propyl)-1,1,3,3-tetramethylguanidine, 2-(3-(triethoxysilyl)propyl)-1,1,3,3-tetramethyl-guanidine, 1,5,7-triazabicyclo-[4.4.0]dec-5-ene (TBD), 7-methyl-1,5,7-triazabicyclo[4.4.0]dec-5-ene, 7-cyclohexyl-1,5,7-triazabicyclo[4.4.0]dec-5-ene, 1-phenylguanidine, 1-(o-tolyl)guanidine (OTG), 1,3-diphenylguanidine, 1,3-di(o-tolyl)guanidine or 2-guanidinobenzimidazole.

Suitable further amidines are especially 1,8-diazabicyclo[5.4.0]undec-7-ene (DBU), 1,5-diazabicyclo[4.3.0]non-5-ene (DBN), 6-dibutylamino-1,8-diaza-bicyclo[5.4.0]undec-7-ene, 6-dibutylamino-1,8-diazabicyclo[5.4.0]undec-7-ene, N,N'-di-n-hexylacetamidine (DHA), 2-methyl-1,4,5,6-tetrahydropyrimidine, 1,2-dimethyl-1,4,5,6-tetrahydropyrimidine, 2,5,5-trimethyl-1,4,5,6-tetrahydro-pyrimidine, N-(3-trimethoxysilylpropyl)-4,5-dihydroimidazole or N-(3-triethoxy-silylpropyl)-4,5-dihydroimidazole.

In addition, the composition may comprise, as cocatalyst, an acid, especially a carboxylic acid. Preference is given to aliphatic carboxylic acids such as formic acid, lauric acid, stearic acid, isostearic acid, oleic acid, 2-ethyl-2,5-dimethylcaproic acid, 2-ethylhexanoic acid, neodecanoic acid, fatty acid mixtures from the hydrolysis of natural fats and oils or di- and polycarboxylic acids, especially poly(meth)acrylic acids.

In a preferred embodiment, the composition is essentially free of organotin compounds. Organotin-free compositions are advantageous in terms of protection of health and protection of the environment. More particularly, the tin content of the curable composition is less than 0.1% A by weight, especially less than 0.05% by weight.

In a further preferred embodiment, the composition comprises a combination of at least one reaction product as described and at least one organotin compound, especially a diorganotin(IV) compound such as those mentioned above.

Such a composition has a high curing rate even in the case of a low tin content, which is advantageous for toxicological and environmental reasons.

In one embodiment, the composition, as well as the reaction product of the invention, additionally comprises at least one organotitanate as catalyst. A combination of the reaction product of the invention and an organotitanate has particularly high catalytic activity. This enables rapid curing of such a composition with a comparatively small use amount of organotitanate. Suitable organotitanates are especially titanium(IV) complexes. Preferred organotitanates are especially selected from

- titanium(IV) complexes having two 1,3-diketonate ligands, especially 2,4-pentanedionate (=acetylacetonate), and two alkoxide ligands;
- titanium(IV) complexes having two 1,3-ketoesterate ligands, especially ethylacetoacetate, and two alkoxide ligands;
- titanium(IV) complexes having one or more aminoalkoxide ligands, especially triethanolamine or 2-((2-aminoethyl)amino)ethanol, and one or more alkoxide ligands;
- titanium(IV) complexes having four alkoxide ligands;
- and more highly condensed organotitanates, especially oligomeric titanium(IV) tetrabutoxide, also referred to as polybutyl titanate;

where suitable alkoxide ligands are especially isobutoxy, n-butoxy, isopropoxy, ethoxy and 2-ethylhexoxy.

Especially suitable are the commercially available products Tyzor® AA, GBA, GBO, AA-75, AA-65, AA-105, DC, BEAT, BTP, TE, TnBT, KTM, TOT, TPT or IBAY (all from Dorf Ketal); Tytan PBT, TET, X85, TAA, ET, S2, S4 or S6 (all from Borica Company Ltd.) and Ken-React® KR® TTS, 7, 9QS, 12, 26S, 33DS, 38S, 39DS, 44, 134S, 138S, 133DS, 158FS or LICA® 44 (all from Kenrich Petrochemicals).

Very particularly suitable organotitanates are selected from bis(ethylaceto-acetato)diisobutoxytitanium(IV) (commercially available, for example, as Tyzor® IBAY from Dorf Ketal), bis(ethylacetoacetato)diisopropoxytitanium (IV) (commercially available, for example, as Tyzor® DC from Dorf Ketal), bis(acetylacetonato)diisopropoxytitanium (IV), bis(acetylacetonato)diisobutoxy-titanium(IV), tris (oxyethyl)amine-isopropoxy-titanium(IV), bis[tris(oxyethyl)-amine]diisopropoxytitanium(IV), bis(2-ethylhexane-1,3-dioxy)titanium(IV), tris[2-((2-aminoethyl)amino) ethoxy]ethoxytitanium(IV), bis(neopentyl(diallyl)oxy)-diethoxytitanium(IV), titanium(IV) tetrabutoxide, tetra(2-ethylhexyloxy) titanate, tetra(isopropoxy) titanate and polybutyl titanate.

Most preferred are bis(ethylacetoacetato)diisobutoxytitanium(IV) or bis(ethylacetoacetato)diisopropoxytitanium (IV).

The composition may comprise further constituents, especially the following auxiliaries and additives:

- adhesion promoters and/or crosslinkers, especially aminosilanes such as, in particular, 3-aminopropyltrimethoxysilane, 3-aminopropyldimethoxymethyl-silane, N-(2-aminoethyl)-3-aminopropyltrimethoxysilane, N-(2-aminoethyl)-3-aminopropyldimethoxymethylsilane, N-(2-aminoethyl)-N'-[3-(trimethoxysilyl)-propyl] ethylenediamine or the analogs thereof with ethoxy in place of methoxy groups, and also N-phenyl-, N-cyclohexyl- or N-alkylaminosilanes, mercaptosilanes, epoxysilanes, (meth)acryloylsilanes, anhydridosilanes, carbamatosilanes, alkylsilanes or iminosilanes, oligomeric forms of these silanes, adducts formed from primary aminosilanes with epoxysilanes or (meth)acryloylsilanes or anhydridosilanes, amino-functional alkylsilsesquioxanes, especially amino-functional methylsilsesquioxane or amino-functional propylsilsesquioxane. Especially suitable are 3-amino-propyltrimethoxysilane, 3-aminopropyltriethoxysilane, N-(2-aminoethyl)-3-aminopropyltrimethoxysilane, N-(2-aminoethyl)-3-aminopropyltriethoxy-silane, 3-glycidoxypropyltrimethoxysilane, 3-glycidoxypropyltriethoxysilane or 3-ureidopropyltrimethoxysilane, or oligomeric forms of these silanes;
- desiccants, especially tetraethoxysilane, vinyltrimethoxysilane, vinyltriethoxysilane or organoalkoxysilanes having a functional group in the a position to the silane group, especially N-(methyldimethoxysilylmethyl)-O-methylcarbamate, (methacryloyloxymethyl)silanes, methoxymethylsilanes, orthoformic esters, calcium oxide or molecular sieves, especially vinyltrimethoxysilane or vinyltriethoxysilane;
- plasticizers, especially trialkylsilyl-terminated polydialkylsiloxanes, preferably trimethylsilyl-terminated polydimethylsiloxanes, especially having viscosities in the range from 10 to 1'000 mPa·s, or corresponding compounds in which some of the methyl groups have been replaced by other organic groups, especially phenyl, vinyl or trifluoropropyl groups, called reactive plasticizers, in the form of monofunctional polysiloxanes, i.e. those that are reactive at one end, carboxylic esters such as phthalates, especially diisononyl phthalate (DINP), diisodecyl phthalate (DIDP) or di(2-propylheptyl) phthalate (DPHP), hydrogenated phthalates, especially hydrogenated diisononyl phthalate (DINCH), terephthalates, especially dioctyl terephthalate, trimellitates, adipates, especially dioctyl adipate, azelates, sebacates, benzoates, polyols, especially polyoxyalkylene polyols or polyester polyols, glycol ethers, glycol esters, organic phosphoric or sulfonic esters, polybutenes, or plasticizers derived from natural fats or oils, especially epoxidized soybean or linseed oil, plasticizers containing siloxane groups being particularly suitable for polymers containing silane groups in the form of polyorganosiloxanes;
- solvents;
- inorganic or organic fillers, especially natural, ground or precipitated calcium carbonates, optionally coated with fatty acids, especially stearic acid, baryte (heavy spar), talcs, quartz flours, quartz sand, dolomites, wollastonites, kaolins, calcined kaolins, mica (potassium aluminum silicate), molecular sieves, aluminum oxides, aluminum hydroxides, magnesium hydroxide, silicas including finely divided silicas from pyrolysis processes, industrially produced carbon blacks, graphite, metal powders such as aluminum, copper, iron, silver or steel, PVC powder or hollow spheres;
- fibers, especially glass fibers, carbon fibers, metal fibers, ceramic fibers or polymer fibers such as polyamide fibers or polyethylene fibers;
- dyes;
- pigments, especially titanium dioxide or iron oxides;
- rheology modifiers, especially thickeners, especially sheet silicates such as bentonites, derivatives of castor oil, hydrogenated castor oil, polyamides, polyurethanes, urea compounds, fumed silicas, cellulose ethers or hydrophobically modified polyoxyethylenes;
- stabilizers against oxidation, heat, light or UV radiation;
- natural resins, fats or oils such as rosin, shellac, linseed oil, castor oil or soya oil;

non-reactive polymers such as, in particular, homo- or copolymers of unsaturated monomers, especially from the group comprising ethylene, propylene, butylene, isobutylene, isoprene, vinyl acetate or alkyl (meth) acrylates, especially polyethylenes (PE), polypropylenes (PP), polyisobutylenes, ethylene-vinyl acetate copolymers (EVA) or atactic poly-α-olefins (APAO);

flame-retardant substances, especially the already mentioned fillers aluminum hydroxide and magnesium hydroxide, or, in particular, organic phosphoric esters such as, in particular, triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenyl phosphate), bisphenol A bis(diphenyl phosphate) or ammonium polyphosphates;

surface-active substances, especially wetting agents, leveling agents, deaerating agents or defoamers;

biocides, especially algicides, fungicides or substances that inhibit fungal growth;

and other substances customarily used in curable compositions. It may be advisable to chemically or physically dry certain constituents before mixing them into the composition.

The composition is preferably produced and stored with exclusion of moisture. Typically, it is storage-stable with exclusion of moisture in a suitable package or arrangement, such as, more particularly, a bottle, a canister, a pouch, a bucket, a vat or a cartridge.

The composition may take the form of a one-component or of a multi-component, especially two-component, composition.

In the present document, "one-component" refers to a composition in which all constituents of the composition are stored in a mixture in the same container and which is curable with moisture.

In the present document, "two-component" refers to a composition in which the constituents of the composition are present in two different components which are stored in separate containers. Only shortly before or during the application of the composition are the two components mixed with one another, whereupon the mixed composition cures, optionally under the action of moisture.

If the composition comprises a polyorganosiloxane having terminal silane groups, preference is given either to a one-component composition, also referred to as RTV-1, or to a two-component composition, also referred to as RTV-2. In the case of an RTV-2 composition, the polyorganosiloxane having terminal silane groups is preferably a constituent of the first component, and a silane crosslinker, especially a silane of the formula (IX), is preferably a constituent of the second component. The reaction product of the invention may be present here in the first and/or the second component.

If the composition comprises an organic polymer containing silane groups, the composition is preferably a one-component composition.

Any second or optionally further components is/are mixed with the first component prior to or on application, especially by means of a static mixer or by means of a dynamic mixer.

The composition is especially applied in a warm environment, preferably within a temperature range between 0° C. and 45° C., especially 5° C. to 35° C., and cures under these conditions too.

On application, the crosslinking reaction of the silane groups commences, if appropriate under the influence of moisture. Silane groups present can condense with silanol groups present to give siloxane groups (Si—O—Si groups). Silane groups present can also be hydrolyzed on contact with moisture to give silanol groups (Si—OH groups) and form siloxane groups (Si—O—Si groups) through subsequent condensation reactions. As a result of these reactions, the composition ultimately cures. The reaction product of the invention accelerates this curing.

If water is required for the curing, this can either come from the air (air humidity) and/or the substrates or fillers, or else the composition can be contacted with a water-containing component, for example by painting, for example with a smoothing agent, or by spraying, or water or a water-containing component can be added to the composition on application, for example in the form of a water-containing or water-releasing liquid or paste. A paste is especially suitable if the composition itself is in the form of a paste.

In the case of curing by means of air humidity, the composition cures from the outside inward, at first forming a skin on the surface of the composition. What is called the skin time is a measure of the curing rate of the composition. The speed of curing is generally determined by various factors, for example the availability of water, temperature, etc.

The composition is suitable for a multitude of uses, especially as a paint, varnish or primer, as a resin for production of fiber composites, as a rigid foam, flexible foam, molding, elastomer, fiber, film or membrane, as a potting compound, sealant, adhesive, covering, coating or paint for construction and industrial applications, for example as a seam seal, cavity seal, electrical insulation compound, spackling compound, joint sealant, weld or crimp seam sealant, assembly adhesive, bodywork adhesive, glazing adhesive, sandwich element adhesive, laminating adhesive, laminate adhesive, packaging adhesive, wood adhesive, parquet adhesive, anchoring adhesive, floor covering, floor coating, balcony coating, roof coating, concrete protection coating, parking garage coating, seal, pipe coating, anticorrosion coating, textile coating, damping element, sealing element or spackling compound. The composition is particularly suitable as an adhesive and/or sealant, especially for joint sealing and for elastic adhesive bonds in construction and industrial applications, and as elastic coating with crack-bridging properties, especially for protection and/or sealing of, for example, roofs, floors, balconies, parking decks or concrete pipes.

The composition is thus preferably an adhesive or a sealant or a coating.

For an application as adhesive or sealant, the composition preferably has a pasty consistency with structurally viscous properties. Such a pasty sealant or adhesive is especially applied to a substrate from standard cartridges which are operated manually, by means of compressed air or with a battery, or from a vat or hobbock by means of a delivery pump or an extruder, optionally by means of an application robot.

For an application as coating, the composition preferably has a liquid consistency at room temperature with self-leveling properties. It may be slightly thixotropic, such that the coating is applicable to sloping to vertical surfaces without flowing away immediately. It is especially applied by means of a roller or brush or by pouring-out and distribution by means, for example, of a roller, a scraper or a notched trowel.

On application, the composition is preferably applied to at least one substrate. Suitable substrates are especially
- glass, glass ceramic, concrete, mortar, brick, tile, gypsum and natural rocks such as granite or marble;
- repair or leveling compounds based on PCC (polymer-modified cement mortar) or ECC (epoxy resin-modified cement mortar);
- metals or alloys, such as aluminum, copper, iron, steel, nonferrous metals, including surface-finished metals, or alloys such as galvanized or chromed metals;
- asphalt or bitumen;
- leather, textiles, paper, wood, woodbase materials bonded with resins such as phenolic, melamine or epoxy resins, resin-textile composites or further polymer composites;
- plastics such as rigid and flexible PVC, polycarbonate, polystyrene, polyester, polyamide, PMMA, ABS, SAN, epoxy resins, phenolic resins, PUR, POM, TPO, PE, PP, EPM or EPDM, in each case untreated or surface-treated, for example by means of plasma, corona or flames;
- fiber-reinforced plastics, such as carbon fiber-reinforced plastics (CFP), glass fiber-reinforced plastics (GFP) and sheet molding compounds (SMC);
- insulation foams, especially made of EPS, XPS, PUR, PIR, rockwool, glass wool or foamed glass;
- coated or painted substrates, especially painted tiles, coated concrete, powder-coated metals or alloys or painted metal sheets;
- paints or varnishes, especially automotive topcoats.

If required, the substrates can be pretreated prior to the application of the composition, especially by chemical and/or physical cleaning methods or by the application of an adhesion promoter, an adhesion promoter solution or a primer.

The composition is particularly suitable for contact with substrates that are particularly sensitive to defects caused by migrating substances, especially by the formation of discoloration or specks. These are, in particular, fine-pore substrates such as marble, limestone or other natural stones, gypsum, cement mortar or concrete, but also plastics. Especially on PVC, severe discoloration is observed in the presence of catalysts, for example DBU or TMG, and cannot be removed by cleaning. No such effects are observed with the reaction product of the invention.

It is possible to bond or seal two identical or two different substrates, especially the aforementioned substrates.

After the curing of the composition with water, especially in the form of air humidity, and/or with at least one suitable crosslinker, a cured composition is obtained.

The use of the composition gives rise to an article which especially has been bonded, sealed or coated with the composition. The article is especially a built structure, especially a structure built by structural engineering or civil engineering, an industrially manufactured good or a consumable good, especially a window, a domestic appliance or a mode of transport such as, more particularly, an automobile, a bus, a truck, a rail vehicle, a ship, an aircraft or a helicopter; or the article may be an installable component thereof.

EXAMPLES

Adduced hereinafter are working examples which are intended to elucidate the invention described in detail. It will be appreciated that the invention is not restricted to these described working examples.

"Standard climatic conditions" refer to a temperature of 23±1° C. and a relative air humidity of 50±5%.

"MW" stands for molecular weight.

"AcEW" stands for acrylate equivalent weight.

"MAcEW" stands for methacrylate equivalent weight.

"EEW" stands for epoxy equivalent weight.

Infrared spectra (FT-IR) were measured on a Nicolet iS5 FT-IR instrument from Thermo Scientific equipped with a horizontal ATR measurement unit with a diamond crystal. Liquid samples were applied undiluted as films; solid samples were dissolved in $CH_2Cl_2$. The absorption bands are reported in wavenumbers ($cm^{-1}$) (measurement window: 4000-650 $cm^{-1}$).

The skin time (ST) was determined by applying a few grams of the composition to cardboard in a layer thickness of about 2 mm and measuring, under standard climatic conditions, the time until, when the surface of the composition was gently tapped by means of an LDPE pipette, there were for the first time no residues remaining any longer on the pipette.

The characteristics of the surface were tested by touch.

The mechanical properties of tensile strength, elongation at break and modulus of elasticity (at 0-5% and at 0-50% elongation) were measured in accordance with DIN EN 53504 at a pulling speed of 200 mm/min.

Polysiloxanes of the Formula (II) Used:

| | |
|---|---|
| Silmer® ACR Di-10 | Acryloyloxy-functional polysiloxane, MW 1'100 g/mol, AcEW 550 g/mol, from Siltech |
| Silmer® ACR D2 | Acryloyloxy-functional polysiloxane, MW 1'400 g/mol, AcEW 560 g/mol, from Siltech |
| Tegomer® V-Si 2250 | Difunctional polysiloxane with acryloyloxyorgano end groups, AcEW about 1000 g/mol, from Evonik |
| X-22-164 | Difunctional polysiloxane with methacryloyloxy end groups, AcEW 190 g/mol, from Shin-Etsu |
| X-22-164AS | Difunctional polysiloxane with methacryloyloxy end groups, AcEW 450 g/mol, from Shin-Etsu |
| Tegomer® E-Si 2330 | Epoxy-functional polydimethylsiloxane, MW about 2'400 g/mol, EEW about 1'200 g/mol, from Evonik |
| Silmer® EP Di-25 | Difunctional polysiloxane with epoxy end groups, MW 2'050 g/mol, EEW 1025 g/mol, from Siltech |

Preparation of Amidine or Guanidine of the Formula HZ or HX-A-Z

Amidine A1: 2-Methyl-1,4,5,6-tetrahydropyrimidine

In a round-bottom flask, 7.58 g of propane-1,3-diamine, 16.37 g of trimethyl orthoacetate and 0.60 g of lanthanum (III) trifluoromethanesulfonate were mixed and the mixture was heated to 100° C. while stirring for 24 hours. Thereafter, the reaction mixture was freed of the volatile constituents under reduced pressure. This gave 5.97 g of a white solid.

FT-IR: 3214, 3177, 2996, 2925, 2843, 1630 (C=N), 1542, 1475, 1438, 1380, 1360, 1322, 1294, 1273, 1204, 1191, 1139, 1114, 1095, 1035, 1009, 977, 915, 875, 839, 731.

Guanidine G1: Reaction Product Comprising 1-(3-aminopropyl)-2,3-dicyclohexylguanidine In a round-bottom flask, 2.50 g of 1,3-diaminopropane and 6.89 g of N,N'-dicyclohexylcarbodiimide were mixed and the mixture was heated to 120° C. while stirring. At regular intervals, the reaction mixture was analyzed by means of FT-IR spectroscopy. After 1 hour, the carbodiimide band at about 2120 $cm^{-1}$ had disappeared completely. Thereafter, the reaction mixture was freed of the volatile constituents under reduced pressure. This gave 9.36 g of a pale yellow oil of low odor.

FT-IR: 3371 (N—H), 2921, 2849, 1627 (C=N), 1502, 1447, 1324, 1238, 1147, 1111, 888, 713.

Preparation of Reaction Products of the Invention

Catalyst U1:

In a round-bottom flask, a solution of 2.14 g of amidine A1 in 7 mL of tetrahydrofuran was mixed with 11.43 g of Silmer® ACR Di-10 and stirred at 40° C. for 40 min. Thereafter, the reaction mixture was freed of the volatile constituents under reduced pressure. This gave an odorless yellowish oil.

FT-IR: 3216, 2960, 1736, 1622 (C=N), 1558, 1415, 1384, 1318, 1257, 1172, 1257, 1210, 1172, 1013, 926, 862, 790, 702.

Catalyst U2:

In a round-bottom flask, a solution of 1.60 g of amidine A1 in 5 mL of tetrahydrofuran was mixed with 4.44 g of Silmer® ACR D2 and stirred at 40° C. for 60 min. Thereafter, the reaction mixture was freed of the volatile constituents under reduced pressure. This gave an odorless brownish oil.

FT-IR: 3175, 2958, 2930, 2852, 1735, 1620 (C=N), 1551, 1484, 1427, 1361, 1318, 1257, 1173, 1012, 943, 841, 793, 754, 687.

Catalyst U3:

In a round-bottom flask, a solution of 2.04 g of amidine A1 in 5 mL of tetrahydrofuran was mixed with 20.02 g of Tegomer® V-Si 2250 and stirred at 40° C. for 2 h. Thereafter, the reaction mixture was freed of the volatile constituents under reduced pressure. This gave an odorless brownish oil.

FT-IR: 2961, 2904, 2862, 1735, 1618 (C=N), 1430, 1413, 1383, 1361, 1318, 1258, 1217, 1179, 1080, 1012, 863, 789, 701, 686.

Catalyst U4:

In a round-bottom flask, 2.25 g of amidine A1 were mixed with 27.22 g of Tegomer® E-Si 2330 and stirred at 90° C. for 3 h. This gave an odorless yellowish oil.

FT-IR: 2961, 2905, 2858, 1616 (C=N), 1413, 1318, 1258, 1011, 863, 792, 700.

Catalyst U5:

In a round-bottom flask, 1.97 g of amidine A1 were mixed with 23.82 g of Silmer® EP Di-25 and stirred at 90° C. for 3 h. This gave an odorless yellowish oil.

FT-IR: 2961, 2904, 2863, 1616 (C=N), 1413, 1318, 1258, 1074, 1011, 863, 792, 699.

Catalyst U6:

In a round-bottom flask, a solution of 1.46 g of guanidine G1 in 4 mL of tetrahydrofuran was mixed with 2.80 g of Silmer® ACR Di-10 and stirred at 25° C. for 2 h. Thereafter, the reaction mixture was freed of the volatile constituents under reduced pressure. This gave an odorless orange oil.

FT-IR: 2960, 2926, 2852, 1733, 1633 (C=N), 1508, 1449, 1411, 1359, 1258, 1183, 1067, 1015, 861, 792, 702.

Catalyst U7:

In a round-bottom flask, a solution of 1.60 g of guanidine G1 in 5 mL of tetrahydrofuran was mixed with 1.55 g of Silmer® ACR Di-10 and stirred at 40° C. for 1 h. Thereafter, the reaction mixture was freed of the volatile constituents under reduced pressure. This gave an odorless brownish oil.

FT-IR: 3270, 2925, 2851, 1732, 1631 (C=N), 1504, 1449, 1360, 1345, 1258, 1147, 1066, 1016, 888, 842, 796, 754, 702.

Catalyst U8:

In a round-bottom flask, a solution of 2.05 g of guanidine G1 in 4 mL of tetrahydrofuran was mixed with 7.34 g of Tegomer® V-Si 2250 and stirred at 40° C. for 3 h. Thereafter, the reaction mixture was freed of the volatile constituents under reduced pressure. This gave an odorless brownish oil.

FT-IR: 3373, 2961, 2929, 2854, 1737, 1633 (C=N), 1519, 1449, 1411, 1364, 1258, 1184, 1367, 1013, 910, 863, 792, 703, 686.

Catalyst U9:

In a round-bottom flask, 1.66 g of guanidine G1 were mixed with 1.03 g of X-22-164 and stirred at 100° C. for 20 h. This gave an odorless, pale green, vitreous solid.

FT-IR: 3291, 2923, 2851, 1750, 1633 (C=N), 1505, 1449, 1375, 1321 1258, 1159, 1051, 978, 937, 889, 839, 794, 709.

Catalyst U10: In a round-bottom flask, 3.41 g of guanidine G1 were mixed with 5.86 g of X-22-164AS and stirred at 100° C. for 48 h. This gave an odorless pale green oil.

FT-IR: 3270, 2926, 2852, 1725, 1627 (C=N), 1568, 1449, 1366, 1317, 1257, 1150, 1018, 889, 783, 703.

Catalyst U11:

In a round-bottom flask, 1.42 g of guanidine G1 were mixed with 6.06 g of Silmer® EP Di-25 and stirred at 90° C. for 5 h. This gave an odorless, slightly cloudy, whitish oil.

FT-IR: 2961, 2928, 2853, 1633 (C=N), 1449, 1412, 1361, 1258, 1077, 1013, 863, 789, 704, 686.

Preparation of Polyethers Containing Silane Groups

Polymer STP-1:

With exclusion of moisture, 1000 g of Acclaim® 12200 polyol (polyoxypropylenediol having a low level of unsaturation, from Bayer; OH number 11.0 mg KOH/g), 43.6 g of isophorone diisocyanate (IPDI; Vestanat® IPDI, from Evonik), 126.4 g of diisodecyl phthalate (DIDP) and 0.1 g of bismuth tris(neodecanoate) (10% by weight in DIDP) were heated up to 90° C. while stirring constantly and left at this temperature until the content of free isocyanate groups determined by titrimetry had reached a stable value of 0.63% by weight. Subsequently, 63.0 g of diethyl N-(3-trimethoxysilylpropyl)aminosuccinate (adduct formed from 3-aminopropyltrimethoxysilane and diethyl maleate; prepared according to the details in U.S. Pat. No. 5,364,955) were mixed in and the mixture was stirred at 90° C. until it was no longer possible to detect any free isocyanate by means of FT-IR spectroscopy. The polyether containing trimethoxysilane groups thus obtained, having a silane equivalent weight of about 6880 g/eq (calculated from the amounts used), was cooled down to room temperature and stored with exclusion of moisture.

Commercial Catalysts Used:

| Cat.41 | Reaction product of tetraethyl silicate with bis(acetyloxy)dibutylstannane, tin content about 23.8% by weight (Catalyst 41, from Wacker) |
| --- | --- |
| DBU | 1,8-diazabicyclo[5.4.0]undec-7-ene (Lupragen ® N 700, from BASF) |
| TMG | 1,1,3,3-tetramethylguanidine (from Sigma-Aldrich) |
| IBAY | bis(ethylacetoacetato)diisobutoxytitanium(IV) (Tyzor ® IBAY, from Dorf Ketal) |

Compositions Based on Polymers Containing Silane Groups:

Comparative examples in tables 1 to 4 are indicated by "(Ref)".

Compositions Z1 to Z13

In a round-bottom flask, 71.1 g of an OH-terminated linear polydimethylsiloxane having a viscosity of about 50'000 mPas at 23° C. (Wacker® Silicone Rubber Polymer FD 50, from Wacker) were blended with 2.6 g of vinyltris (methylethylketoximo)silane and stirred under reduced pressure for 15 minutes. 26.3 g of trimethylsilyl-terminated polydimethylsiloxane (Wacker® AK 100 silicone oil, from Wacker) were stirred into the polydimethylsiloxane having vinylbis(methylethylketoximo)silyl end groups that was obtained in this way. This mixture was blended with various catalysts according to table 1 below and the mixture was tested for viscosity and skin time (ST) under standard climatic conditions, before and after storage. The skin time serves as a measure of the activity of the catalyst in relation to the crosslinking reaction of the silane groups, i.e. of the crosslinking rate; the change in viscosity and the skin time after storage are a measure of storage stability. In addition, the mixture applied, after 24 hours under standard climatic conditions, was tested as to whether the surface was dry as desired or whether a greasy film had formed, which is a sign of the exudation of the catalyst owing to poor compatibility with the cured polymer, and/or whether the surface was tacky, which is a sign of incomplete curing. In addition, the mixture was used to produce a film of thickness 2 mm, which was cured under standard climatic conditions for 7 days and tested for mechanical properties.

The results are shown in tables 1 and 2.

In addition, each mixture was applied to a white PVC substrate in the form of a bead and cured under standard climatic conditions. Thereafter, the substrate was heated to 80° C. in an oven for 1 hour. Thereafter, in the case of reference compositions Z11 and Z12, brownish discoloration was apparent on the PVC substrate alongside and beneath the cured bead, whereas no discoloration occurred in the case of the other compositions.

TABLE 2

| Composition | Surface after 24 h | Tensile strength | Elongation at break | Modulus of elasticity 0-50% elongation |
|---|---|---|---|---|
| Z1 | dry | 0.25 MPa | 278% | 0.14 MPa |
| Z2 | dry | 0.22 MPa | 260% | 0.14 MPa |
| Z3 | dry | n.d. | n.d. | n.d. |
| Z4 | dry | 0.25 MPa | 307% | 0.13 MPa |
| Z5 | dry | n.d. | n.d. | n.d. |
| Z6 | dry | n.d. | n.d. | n.d. |
| Z7 | dry | 0.19 MPa | 142% | 0.12 MPa |
| Z8 | dry | 0.23 MPa | 196% | 0.14 MPa |
| Z9 | dry | 0.19 MPa | 213% | 0.14 MPa |
| Z10 (ref.) | dry | 0.24 MPa | 256% | 0.15 MPa |
| Z11 (ref.) | dry | 0.22 MPa | 135% | 0.13 MPa |
| Z12 (ref.) | dry | 0.15 MPa | 86% | 0.16 MPa |
| Z13 (ref.) | dry | 0.25 MPa | 116% | 0.18 MPa |

"n.d." stands for "not determined"

Compositions Z14 to Z23:

A composition composed of 96.5 g of polymer STP-1, 0.5 g of vinyltrimethoxysilane and 3.0 g of 3-aminopropylt-rimethoxysilane was blended with various catalysts in the amount specified according to table 3, and tested as described for composition Z1 for viscosity, skin time (ST), surface characteristics and mechanical properties.

The results are shown in tables 3 and 4.

In addition, each mixture was applied to a white PVC substrate in the form of a bead and cured under standard climatic conditions. Thereafter, the substrate was heated to 80° C. in an oven for 1 hour. Thereafter, in the case of reference compositions Z22 and Z23, brownish discoloration was apparent on the PVC substrate alongside and beneath the cured bead, whereas no discoloration occurred in the case of the other compositions.

TABLE 1

| Composition | Catalyst | Amount | Concentration[1] | Viscosity [Pa · s] fresh | Viscosity [Pa · s] stored[2] | ST fresh | ST stored[2] |
|---|---|---|---|---|---|---|---|
| Z1 | U1 | 0.22 g | 0.5 | 11.8 | 11.9 | 22' | 20' |
| Z2 | U2 | 0.30 g | 1.0 | 14.7 | 12.9 | 20' | 17' |
| Z3 | U3 | 0.38 g | 0.5 | 12.1 | 12.5 | 35' | 30' |
| Z4 | U4 | 0.46 g | 0.5 | 15.0 | 11.0 | 30' | 30' |
| Z5 | U6 | 0.29 g | 0.5 | 12.9 | 11.6 | 26' | 22' |
| Z6 | U7 | 0.39 g | 1.0 | 14.8 | 14.3 | 29' | 31' |
| Z7 | U8 | 0.46 g | 0.5 | 11.6 | 11.8 | 42' | 47' |
| Z8 | U10 | 0.27 g | 0.5 | 14.7 | 12.9 | 26' | 20' |
| Z9 | U11 | 0.53 g | 0.5 | 15.4 | 13.7 | 30' | 27' |
| Z10 (ref.) | Cat.41 | 0.33 g | 0.9 | 11.7 | 48.1 | 27' | 32' |
| Z11 (ref.) | DBU | 0.04 g | 0.4 | 18.2 | 15.9 | 10' | 12' |
| Z12 (ref.) | TMG | 0.03 g | 0.4 | 17.4 | 16.5 | 23' | 27' |
| Z13 (ref.) | IBAY | 0.13 g | 0.4 | 19.7 | 19.9 | 27' | 47' |

[1]mmol of amidine or guanidine groups or metal atoms per 100 g of ketoximato polydimethylsiloxane polymer.
[2]for 7 days at 70° C. in a closed container.

TABLE 3

| Composition | Catalyst | Amount | Concentration[1] | Viscosity [Pa · s] fresh | Viscosity [Pa · s] stored[2] | ST fresh | ST stored[2] |
|---|---|---|---|---|---|---|---|
| Z14 | U1 | 1.14 g | 1.9 | 29.2 | 38.1 | 22' | 20' |
| Z15 | U3 | 1.95 g | 1.9 | 29.7 | 44.8 | 45' | 18' |
| Z16 | U4 | 2.36 g | 1.9 | 27.0 | 49.3 | 35' | 31' |
| Z17 | U5 | 2.36 g | 1.9 | 27.8 | 51.0 | 30' | 30' |
| Z18 | U6 | 1.50 g | 1.9 | 29.9 | 45.2 | 13' | 7' |
| Z19 | U8 | 2.36 g | 1.9 | 28.7 | 45.3 | 36' | 31' |
| Z20 | U9[3] | 0.83 g | 1.9 | 20.7 | 39.5 | 13' | 14' |
| Z21 | U10 | 1.40 g | 1.9 | 41.0 | 53.6 | 13' | 12' |
| Z22 (ref.) | DBU | 0.28 g | 1.9 | 27.2 | 36.9 | 25' | 29' |
| Z23 (ref.) | TMG | 0.21 g | 1.9 | 22.3 | 24.6 | 65' | 75' |

[1]mmol of amidine or guanidine groups per 100 g of polyether containing silane groups.
[2]for 7 days at 70° C. in a closed container.
[3]as a solution (25% by wt.) in N-ethylpyrrolidone.

TABLE 4

| Composition | Surface after 24 h | Tensile strength | Elongation at break | Modulus of elasticity 0-5% | Modulus of elasticity 0-50% |
|---|---|---|---|---|---|
| Z14 | dry | 0.67 MPa | 101% | 1.27 MPa | 0.83 MPa |
| Z15 | dry | 0.75 MPa | 124% | 1.23 MPa | 0.82 MPa |
| Z16 | dry | 0.82 MPa | 130% | 1.14 MPa | 0.83 MPa |
| Z17 | dry | 0.85 MPa | 142% | 1.25 MPa | 0.82 MPa |
| Z18 | dry | 0.71 MPa | 113% | 1.09 MPa | 0.82 MPa |
| Z19 | dry | 0.81 MPa | 141% | 1.21 MPa | 0.84 MPa |
| Z20 | dry | 0.70 MPa | 103% | 1.28 MPa | 0.83 MPa |
| Z21 | dry | 0.78 MPa | 118% | 1.12 MPa | 0.85 MPa |
| Z22 (ref.) | greasy | 0.58 MPa | 72% | 1.16 MPa | 0.77 MPa |
| Z23 (ref.) | tacky | 0.62 MPa | 90% | 1.19 MPa | 0.75 MPa |

The invention claimed is:

1. A composition comprising:
   at least one polymer containing silane groups, and
   at least one reaction product and/or at least one compound of the formula (I),

$$[Q-L \!-\!\!]_{(q-r)} P \!-\!\![L-Q'-Y]_r \quad (I)$$

wherein the at least one reaction product is obtained from a reaction of:
     at least one amidine of the formula HZ or HX-A-Z1, or
     at least one guanidine of the formula HX-A-Z1,
   with at least one polysiloxane of the formula (II),

$$P \!-\!\![L-Q]_q \quad (II)$$

where:
     q is 1 or 2 and r is 1 or 2, with (q-r) being 0 or 1,
     P is a q-valent polysiloxane radical having 3 to 100 silicon atoms,
     L is an alkylene radical which is bonded to a silicon atom of P and has 1 to 12 carbon atoms,
     Q is a reactive group selected from glycidoxy, N-aziridinyl, 1,3-keto ester, 1,3-keto amide, (meth)acrylate, and (meth)acrylamide,
     Q' is a divalent connecting unit formed from the reaction of a reactive Q group with HY,
     Y is Z or is —X-A-Z1,
     Z is an aliphatic amidine group bonded via a nitrogen atom,
     Z1 is an aliphatic amidine or guanidine group via a nitrogen atom,
     A is a divalent hydrocarbyl radical which has 2 to 30 carbon atoms and optionally contains unsaturated components and optionally ether oxygen or secondary or tertiary amine nitrogen, where at least 2 of the 2 to 30 carbon atoms are resent in a chain of A that links X and Z1, and
     X is S or NR[7], where R[7] is a hydrogen radical or is an alkyl or cycloalkyl or aralkyl radical which has 1 to 8 carbon atoms and optionally contains a tertiary amino group or an amidine or guanidine group,
     where A together with R[7] may also be a trivalent hydrocarbyl radical which has 5 to 10 carbon atoms and optionally contains a tertiary amine nitrogen.

2. The composition as claimed in claim 1, wherein the composition is an adhesive or a sealant or a coating.

3. The composition as claimed in claim 1, wherein P is a divalent polysiloxane radical of the formula (IVa)

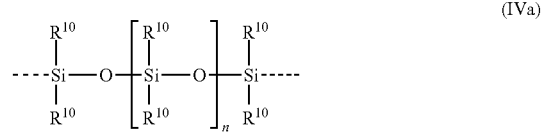

(IVa)

where:
  R[10] is independently a monovalent hydrocarbyl radical having 1 to 12 carbon atoms, and
  n is an integer from 1 to 48.

4. The composition as claimed in claim 1, wherein the amidine of the formula HZ or HX-A-Z1 or the guanidine of the formula HX-A-Z1 is an amidine of the formula (IIIa)

(IIIa)

where R[3] is a hydrogen radical or methyl radical.

5. The composition as claimed in claim 1, wherein the amidine of the formula HZ or HX-A-Z1 or the guanidine of the formula HX-A-Z1 is an amidine of the formula (IIIb)

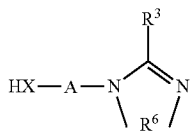
(IIIb)

where $R^3$ is a hydrogen radical or methyl radical.

6. The composition as claimed in claim 1, wherein the amidine of the formula HZ or HX-A-Z1 or the guanidine of the formula HX-A-Z1 is a guanidine of the formula (IIIc)

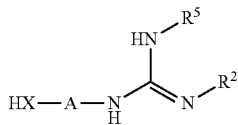
(IIIc)

where $R^2$ and $R^5$ are each independently an alkyl, cycloalkyl or aralkyl radical which has 1 to 12 carbon atoms and optionally contains an ether oxygen or tertiary amine nitrogen.

7. The composition as claimed in claim 1, wherein Q' is selected from the group consisting of:

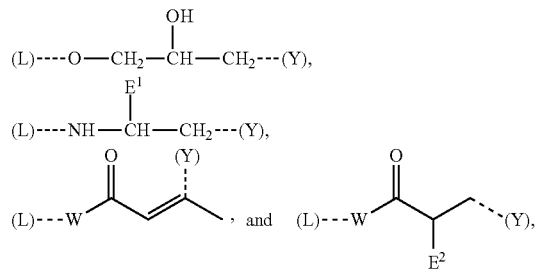

where:
E$^1$ is a hydrogen radical or methyl radical,
E$^2$ is a hydrogen radical or methyl radical, and
W is O or NR$^{14}$ where R$^{14}$ is a hydrogen radical or is a monovalent hydrocarbyl radical having 1 to 8 carbon atoms.

* * * * *